(12) United States Patent
Chiang et al.

(10) Patent No.: US 12,498,547 B2
(45) Date of Patent: Dec. 16, 2025

(54) CAMERA MODULE AND TERMINAL DEVICE

(71) Applicant: HUAWEI TECHNOLOGIES CO., LTD., Guangdong (CN)

(72) Inventors: Yita Chiang, Dongguan (CN); Zhiming Liang, Shenzhen (CN); Guangxue Zhang, Shenzhen (CN)

(73) Assignee: Huawei Technologies Co., LTD., Shenzhen (CN)

( * ) Notice: Subject to any disclaimer, the term of this patent is extended or adjusted under 35 U.S.C. 154(b) by 416 days.

(21) Appl. No.: 18/161,720

(22) Filed: Jan. 30, 2023

(65) Prior Publication Data

US 2023/0176340 A1    Jun. 8, 2023

Related U.S. Application Data

(63) Continuation of application No. PCT/CN2021/085895, filed on Apr. 8, 2021.

(30) Foreign Application Priority Data

Jul. 31, 2020    (CN) .......................... 202010760690.6

(51) Int. Cl.
*G02B 13/00*    (2006.01)
*G03B 13/36*    (2021.01)
(Continued)

(52) U.S. Cl.
CPC .......... *G02B 13/0065* (2013.01); *G03B 30/00* (2021.01); *H04N 23/55* (2023.01); *G03B 13/36* (2013.01); *H04M 1/0264* (2013.01)

(58) Field of Classification Search
CPC .... G02B 13/0065; G02B 13/00; G03B 30/00; G03B 13/36; G03B 17/17; G03B 19/22;
(Continued)

(56) References Cited

U.S. PATENT DOCUMENTS

2020/0057282 A1*  2/2020  Shabtay ................... G02B 7/09
2020/0064598 A1   2/2020  Shabtay et al.

FOREIGN PATENT DOCUMENTS

CN          105163011 A      12/2015
CN          107820000 A  *   3/2018  ........... H04N 5/2253
(Continued)

OTHER PUBLICATIONS

International Search Report and Written Opinion in International Appln. No. PCT/CN2021/085895, mailed on Jun. 29, 2021, 17 pages (with English translation).

*Primary Examiner* — Jia X Pan
(74) *Attorney, Agent, or Firm* — Fish & Richardson P.C.

(57) ABSTRACT

Example camera modules and terminal devices are provided. In one example camera module, both a first optical lens assembly and a second optical lens assembly may be configured to receive light from a photographed object. A first optical path folding element and a third optical path folding element are respectively located on two sides of a second optical path folding element. The first optical path folding element can cooperate with the second optical path folding element to perform optical path folding on light from the first optical lens assembly and focus the light on a first image sensor. The third optical path folding element can cooperate with the second optical path folding element to perform optical path folding on light from the second optical lens assembly and focus the light on a second image sensor.

20 Claims, 18 Drawing Sheets

(51) Int. Cl.
*G03B 30/00* (2021.01)
*H04M 1/02* (2006.01)
*H04N 23/55* (2023.01)

(58) Field of Classification Search
CPC ........ H04N 23/55; H04N 23/45; H04N 23/54; H04N 23/57; H04N 23/60; H04M 1/0264
See application file for complete search history.

(56) References Cited

FOREIGN PATENT DOCUMENTS

| | | | |
|---|---|---|---|
| CN | 208386734 U | | 1/2019 |
| CN | 110035208 A | | 7/2019 |
| CN | 209057293 U | | 7/2019 |
| CN | 209710206 U | | 11/2019 |
| CN | 110913096 A | * | 3/2020 |
| CN | 111246070 A | | 6/2020 |

* cited by examiner

CAMERA MODULE AND TERMINAL DEVICE

CROSS-REFERENCE TO RELATED APPLICATIONS

This application is a continuation of International Application No. PCT/CN2021/085895, filed on Apr. 8, 2021, which claims priority to Chinese Patent Application No. 202010760690.6, filed on Jul. 31, 2020. The disclosures of the afore-mentioned applications are hereby incorporated by reference in their entireties.

TECHNICAL FIELD

This application relates to the field of photographing technologies, and in particular, to a camera module and a terminal device.

BACKGROUND

With development of science and technology, electronic devices such as a mobile phone integrate more and more functions including photographing. In addition, a user gradually improves requirements on the electronic devices such as the mobile phone. For example, photographing may have a higher optical zoom magnification and higher image quality, and the electronic devices are lighter and thinner.

Currently, two or more lenses are cooperatively used to improve image quality. However, to obtain a high optical zoom magnification, one functional component that can perform optical path folding needs to be respectively configured for each lens. In this case, a camera module is large in volume and utilization of an internal space of the electronic device is low, which are not conducive to implementing lightening and thinning.

SUMMARY

This application provides a camera module and a terminal device, to reduce a volume of the camera module and facilitate miniaturization of the terminal device.

According to a first aspect, a camera module is provided. The camera module may be applied to a terminal device, for example, a mobile phone, a tablet computer, or a PDA, and includes a first optical lens assembly, a second optical lens assembly, a light adjustment assembly, a first image sensor, and a second image sensor. Both the first optical lens assembly and the second optical lens assembly may be configured to receive light from a photographed object. The light adjustment assembly includes a first optical path folding element, a second optical path folding element, and a third optical path folding element. The first optical path folding element and the third optical path folding element are respectively located on two sides of the second optical path folding element. The first optical path folding element can cooperate with the second optical path folding element, to perform optical path folding on light from the first optical lens assembly and focus the light on the first image sensor. The third optical path folding element can cooperate with the second optical path folding element, to perform optical path folding on light from the second optical lens assembly and focus the light on the second image sensor. The first optical path folding element and the third optical path folding element share one second optical path folding element, to respectively perform optical path folding on the light from the first optical lens assembly and the light from the second optical lens assembly, so that there is no need to separately pair one optical path folding element for the first optical path folding element and the third optical path folding element, thereby facilitating reduction of a volume of the camera module.

There may be a plurality of manners in which the first optical path folding element cooperates with the second optical path folding element to perform optical path folding on the light. In a specific implementable solution, the first optical path folding element has M1 first reflective surfaces, and the M1 first reflective surfaces face the second optical path folding element. The second optical path folding element has M2 second reflective surfaces, and the M2 second reflective surfaces face the first optical path folding element. The light from the first optical lens assembly is reflected between the M1 first reflective surfaces and the M2 second reflective surfaces, to perform optical path folding, and the folded light is reflected to the first image sensor. There may be a plurality of manners in which the second optical path folding element cooperates with the third optical path folding element to perform optical path folding on the light. In a specific implementable solution, the second optical path folding element includes M3 third reflective surfaces, and the M3 third reflective surfaces face the third optical path folding element. The third optical path folding element includes M4 fourth reflective surfaces, and the M4 fourth reflective surfaces face the second optical path folding element. The light from the second optical lens assembly is reflected between the M3 third reflective surfaces and the M4 fourth reflective surfaces, to perform optical path folding, and the folded light is reflected to the second image sensor, where M1, M2, M3, and M4 are all positive integers. In addition, an optical path may be folded in a refracted manner.

In a specific implementable solution, along a direction away from the first optical lens assembly, the M1 first reflective surfaces are successively connected, and the M2 second reflective surfaces are successively connected. When M1≤M2, each of the M1 first reflective surfaces is parallel to one of the M2 second reflective surfaces; or when M1>M2, each of the M2 second reflective surfaces is parallel to one of the M1 first reflective surfaces. An included angle $\theta 1$ of every two adjacent first reflective surfaces meets: $60° \leq \theta 1 \leq 120°$, and an included angle $\theta 2$ of every two adjacent second reflective surfaces meets: $60° \leq \theta 2 \leq 120°$. It is convenient to assemble the camera module, to avoid an inclination of an image formed on the first image sensor.

In a specific implementable solution, $|M1-M2|=1$. When M1>M2, the last first reflective surface is bent in a direction toward the second optical path folding element, and is configured to reflect light from a first reflective surface previous to the last first reflective surface to the first image sensor along a first direction, where the first direction is a direction in which the first optical path folding element points to the third optical path folding element, and the last first reflective surface is a first reflective surface farthest from the first optical lens assembly; or when M1<M2, the last second reflective surface is bent in a direction toward the first optical path folding element, and is configured to reflect light from a second reflective surface previous to the last second reflective surface to the first image sensor along a second direction, where the second direction is a direction in which the third optical path folding element points to the first optical path folding element, and the last second reflective surface is a second reflective surface farthest from the first optical lens assembly. By making full use of a space length in the first direction (or the second direction), an optical path length is increased without increasing a size of the camera module in a direction perpendicular to the first direction.

In a specific implementable solution, along a direction away from the second optical lens assembly, the M3 third reflective surfaces are successively connected, and the M4 fourth reflective surfaces are successively connected. When M3≤M4, each of the M3 third reflective surfaces is parallel to one of the M4 fourth reflective surfaces; or when M3>M4, each of the M4 fourth reflective surfaces is parallel to one of the M3 third reflective surfaces. In addition, an included angle θ3 of every two adjacent third reflective surfaces meets: 60°≤θ3≤120°. It is convenient to assemble the camera module, to avoid an inclination of an image formed on the second image sensor. In addition, an included angle θ4 of every two adjacent fourth reflective surfaces meets: 60°≤θ4≤120°.

In a specific implementable solution, |M3−M4|=1. When M3>M4, the last third reflective surface is bent in a direction toward the third optical path folding element, and is configured to reflect light from a third reflective surface previous to the last third reflective surface to the second image sensor along the first direction, where the first direction is a direction in which the first optical path folding element points to the third optical path folding element, and the last third reflective surface is a third reflective surface farthest from the second optical lens assembly; or when M3<M4, the last fourth reflective surface is bent in a direction toward the third optical path folding element, and is configured to reflect light from a fourth reflective surface previous to the last fourth reflective surface to the second image sensor along the second direction, where the second direction is a direction in which the third optical path folding element points to the first optical path folding element, and the last fourth reflective surface is a fourth reflective surface farthest from the second optical lens assembly. By making full use of a space length in the first direction (or the second direction), an optical path length is increased without increasing a size of the camera module in a direction perpendicular to the first direction.

In a specific implementable solution, M2=M3. The M2 second reflective surfaces are in a one-to-one correspondence with the M3 third reflective surfaces, and each group of the second reflective surface and the third reflective surface that correspond to each other are disposed back-to-back and parallel to each other, to reduce a size of the camera module in a direction from the first optical path folding element to the third optical path folding element.

In another specific implementable solution, M2=M3. The M2 second reflective surfaces are in a one-to-one correspondence with the M3 third reflective surfaces, each group of the second reflective surface and the third reflective surface that correspond to each other are disposed back-to-back, and an included angle θ5 between each group of the second reflective surface and the third reflective surface that correspond to each other meets: 0°<θ5<180°.

There may be a plurality of manners of forming each of the first reflective surface, the second reflective surface, the third reflective surface, and the fourth reflective surface. In a specific implementable solution, at least a part of the M1 first reflective surfaces is a reflective surface of a plane mirror, and/or at least a part of the first reflective surfaces is an inner side or an outer side of a right-angle surface of a right-angle triangular prism. At least a part of the M2 second reflective surfaces is a reflective surface of a plane mirror, and/or at least a part of the second reflective surfaces is an inner side or an outer side of a right-angle surface of a right-angle triangular prism. At least a part of the M3 third reflective surfaces is a reflective surface of a plane mirror, and/or at least a part of the third reflective surfaces is an inner side or an outer side of a right-angle surface of a right-angle triangular prism. At least a part of the M4 fourth reflective surfaces is a reflective surface of a plane mirror, and/or at least a part of the fourth reflective surfaces is an inner side or an outer side of a right-angle surface of a right-angle triangular prism.

In another specific implementable solution, the second optical path folding element includes at least one right-angle triangular prism. Inner sides of two right-angle surfaces of each right-angle triangular prism face the first optical path folding element, and form two second reflective surfaces. Outer sides of the two right-angle surfaces of each right-angle triangular prism face the third optical path folding element, and form two third reflective surfaces.

In another specific implementable solution, the second optical path folding element includes at least one plane mirror. One side surface of each plane mirror faces the first optical path folding element, and forms one second reflective surface. The other side surface thereof faces the third optical path folding element, and forms one third reflective surface.

To focus the first optical lens assembly and the second optical lens assembly, in a specific implementable solution, the camera module further includes a drive assembly. The drive assembly is configured to adjust a distance between the first optical path folding element and the second optical path folding element, to focus the light from the first optical lens assembly on the first image sensor; and is configured to adjust a distance between the second optical path folding element and the third optical path folding element, to focus the light from the second optical lens assembly on the second image sensor.

In a more specific implementable solution, the drive assembly is specifically configured to drive the second optical path folding element to move in a direction close to the first optical path folding element, or move in a direction close to the third optical path folding element.

In another more specific implementable solution, the drive assembly is specifically configured to: drive the first optical path folding element to be close to or away from the second optical path folding element; and drive the third optical path folding element to be close to or away from the second optical path folding element.

According to a second aspect, a terminal device is provided, where the terminal device may be a mobile phone, a tablet computer, or a PDA, and includes a protective case and the camera module provided in any one of the foregoing technical solutions. The camera module is disposed inside the protective case. In the camera module, a first optical path folding element and a third optical path folding element share one second optical path folding element, to respectively perform optical path folding on light from a first optical lens assembly and light from a second optical lens assembly, so that there is no need to separately pair one optical path folding element for the first optical path folding element and the third optical path folding element, thereby facilitating reduction of a volume of the camera module, and further lightening and thinning the terminal device.

BRIEF DESCRIPTION OF DRAWINGS

FIG. 2b is a top view of the camera module shown in FIG. 2a;

FIG. 2d shows a transmission path of light passing through a first optical lens assembly 50a;

FIG. 3 is a schematic diagram of a possible lens combination of a first optical lens assembly 50a;

FIG. 5a shows a variation of the camera module shown in FIG. 2a;

FIG. 5b shows another variation of the camera module shown in FIG. 2a;

FIG. 6 shows another variation of the camera module shown in FIG. 2a;

FIG. 7 shows another variation of the camera module shown in FIG. 2a;

FIG. 8 shows another variation of the camera module shown in FIG. 2a;

FIG. 10b is a stereoscopic diagram of the camera module shown in FIG. 10a;

DESCRIPTION OF EMBODIMENTS

To make objectives, technical solutions, and advantages of this application clearer, the following further describes this application in detail with reference to the accompanying drawings.

Figure 1:
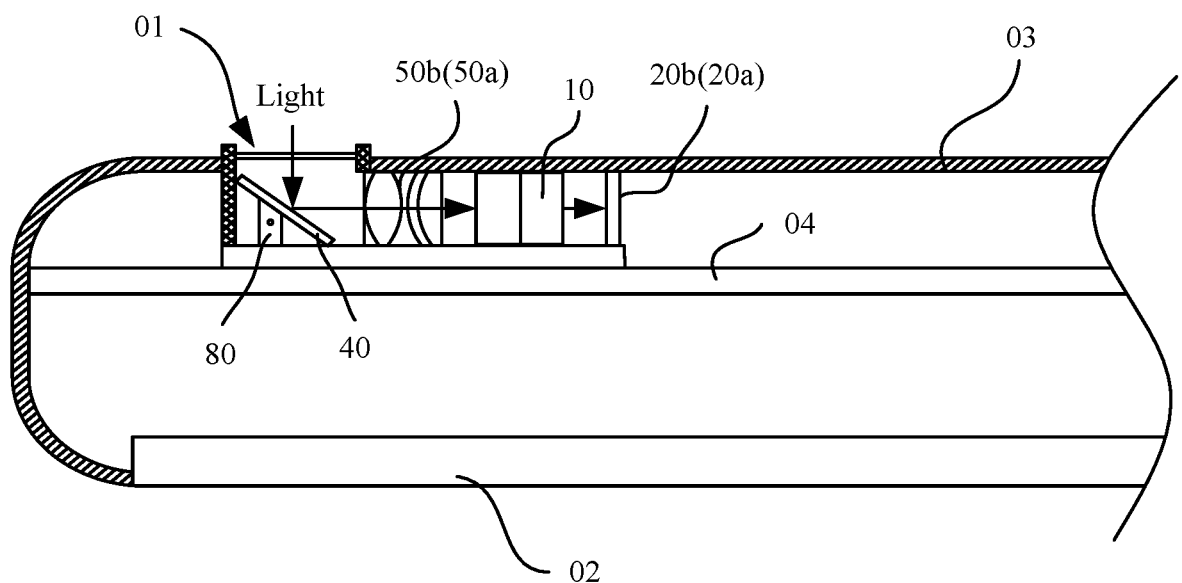
FIG. 1 is a schematic diagram of applying a camera module according to an embodiment of this application to a mobile phone.

To facilitate understanding of a camera module provided in embodiments of this application, a scenario to which the camera module is applied is first described. The camera module may be used in terminal devices such as a mobile phone, a tablet computer, and a PDA (personal digital assistant, personal digital assistant) that have requirements for photographing, video recording, or other picture collection. FIG. 1 is a schematic diagram of applying a camera module according to an embodiment of this application to a mobile phone. With reference to FIG. 1, for example, a terminal device is a mobile phone. The mobile phone may include a protective case 03, a middle frame 04, and a display screen 02. The display screen 02 may be on a front side of the middle frame 04, the protective case 03 is on a rear side of the middle frame 04, and a cooperation manner of the protective case 03, the middle frame 04, and the display screen 02 may be known in the conventional technology. This is not described herein. The terminal device further includes a camera module 01 provided in this embodiment of this application, and the camera module 01 is located between the protective case 03 and the middle frame 04. A light opening is provided on a rear side of the protective case 03, and light of an external environment enters the terminal device from the light opening, to enter the camera module 01 for imaging. However, it should be understood that, the scenario of the camera module 01 in FIG. 1 is merely an example. For example, the camera module 01 may be alternatively used as a front camera module of the mobile phone.

The following describes the camera module provided in this embodiment of this application with reference to the accompanying drawings.

Figure 2A:
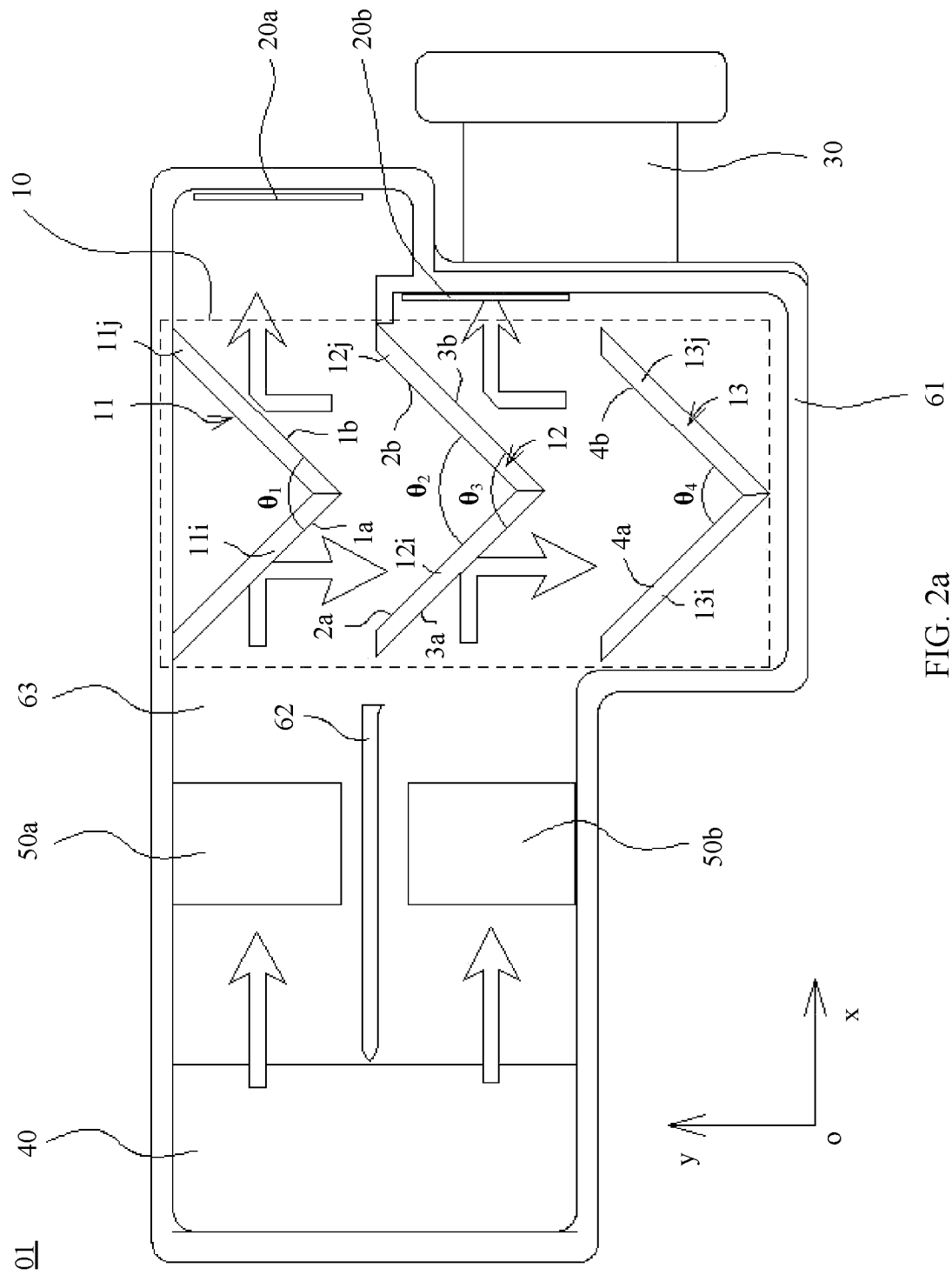
FIG. 2a is a stereoscopic diagram of a camera module according to an embodiment of this application.
Figure 2B:
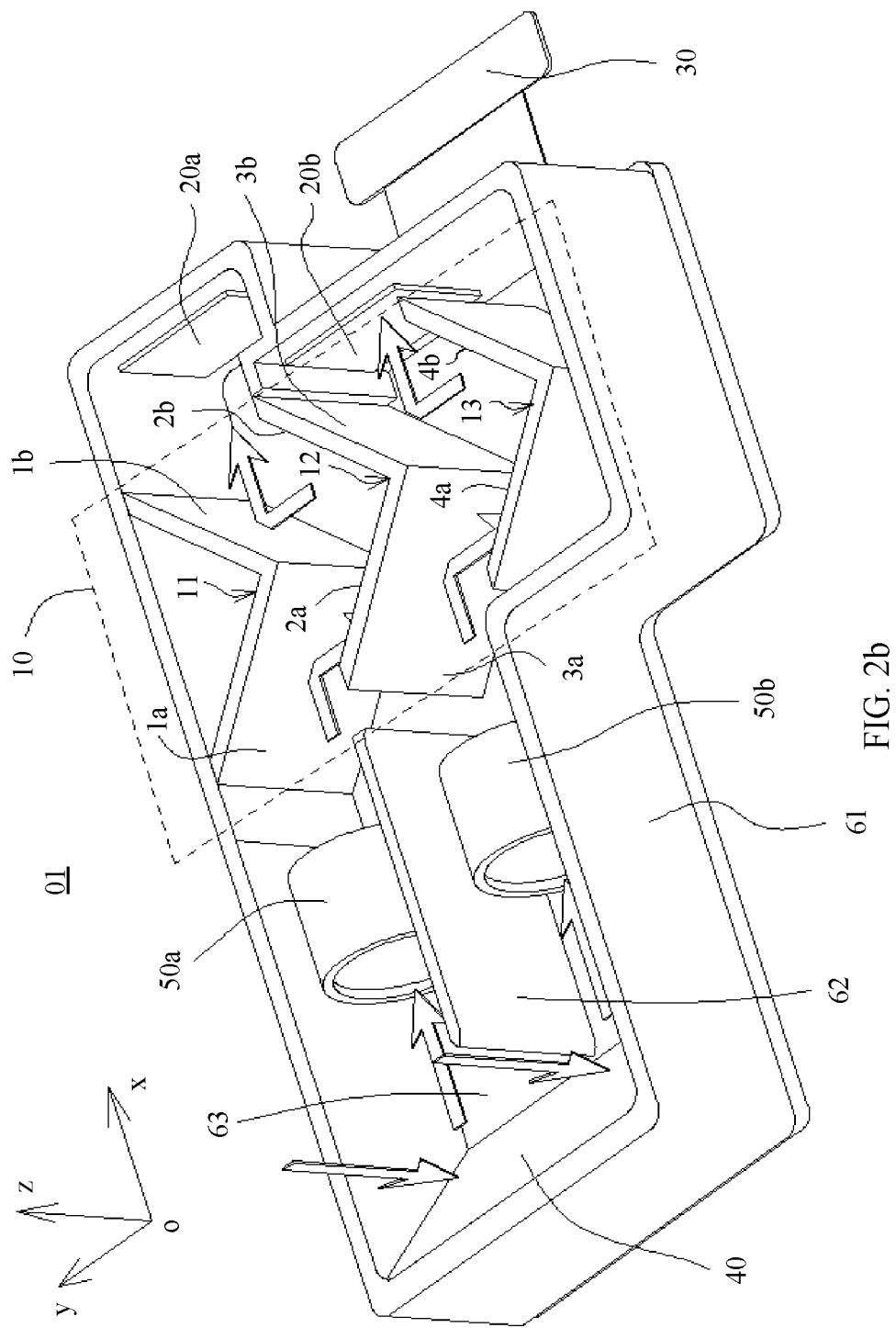
Figure 2C:
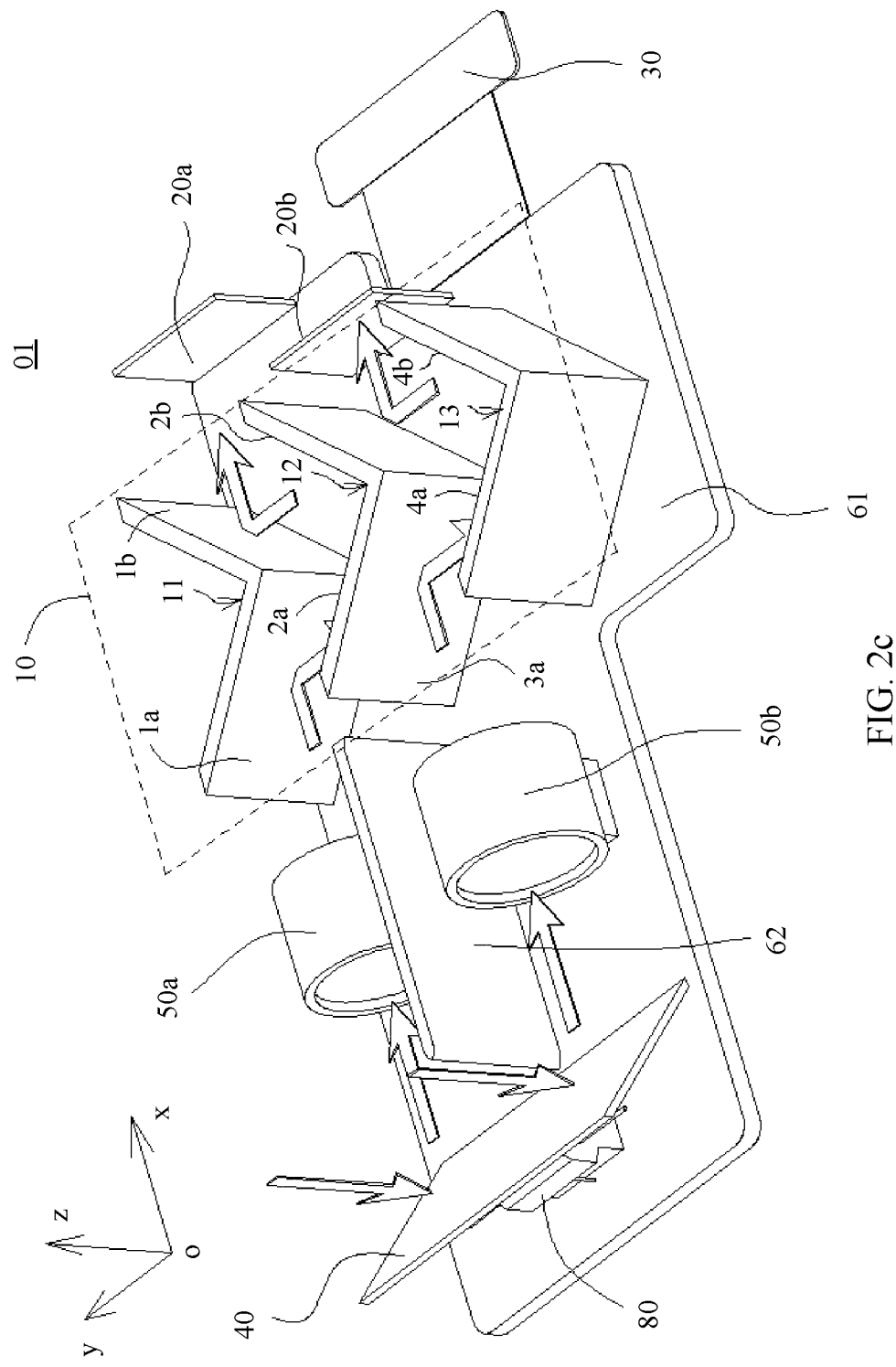
FIG. 2c is a schematic diagram of the camera module shown in FIG. 2a after an enclosure wall 61 is removed.

FIG. 2a is a stereoscopic diagram of a camera module according to an embodiment of this application. FIG. 2b is a top view of the camera module shown in FIG. 2a. FIG. 2c is a schematic diagram of the camera module shown in FIG. 2a after an enclosure wall 61 is removed. With reference to FIG. 2a to FIG. 2c, for example, the camera module 01 includes a housing, a periscope reflector 40, a first optical lens assembly 50a, a second optical lens assembly 50b, a light adjustment assembly 10, a first image sensor 20a, and a second image sensor 20b. The housing includes a bottom wall 63 (whose surface is parallel to an xoy plane) and the enclosure wall 61 (parallel to a z-axis) disposed along an edge of the bottom wall 63. The housing may further include a cover with a light opening, to form an accommodation space together with the bottom wall 63 and the enclosure wall 61. The first optical lens assembly 50a, the second optical lens assembly 50b, the light adjustment assembly 10, the first image sensor 20a, and the second image sensor 20b are all disposed in the accommodation space.

An included angle between a mirror surface of the periscope reflector 40 and a surface of the bottom wall 63 is an acute angle, and the acute angle may be between 30° and 60°, for example, may be 30°, 45°, or 60°. The first optical lens assembly 50a and the second optical lens assembly 50b are disposed in parallel (for example, arranged along a y-axis direction) and are both located in an x direction of the periscope reflector 40, and both a light inlet of the first optical lens assembly 50a and a light inlet of the second optical lens assembly 50b face the mirror surface of the periscope reflector 40.

Figure 3:
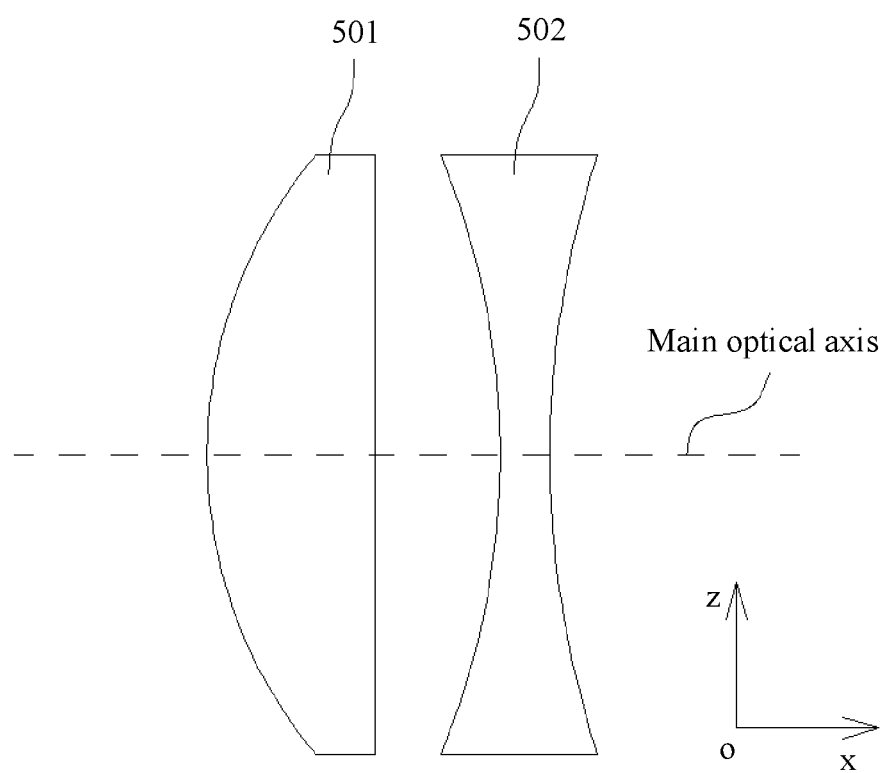

A main optical axis of the first optical lens assembly 50a and a main optical axis of the second optical lens assembly 50b are parallel to each other, for example, both extend along an x-axis direction. It should be understood that, "parallel" herein refers to substantially parallel, that is, for a person skilled in the art, "parallel" may be absolutely parallel, or there may be an included angle (for example, an angle error with parallel is within a range of ±3°). In addition, that the two are parallel to each other is merely an example. This is not limiting. The main optical axis may be a straight line that passes through two spherical centers of the lens. FIG. 3 is a schematic diagram of a possible lens combination of the first optical lens assembly 50a. A lens 501 is a plano convex lens, and a lens 502 is a double concave lens. A main optical axis of the lens 501 is coaxial with a main optical axis of the lens 502, and is referred to as the main optical axis of the first optical lens assembly 50a, and the main optical axis successively passes through a spherical center of a convex surface (which is a spherical surface) of the lens 501 and spherical centers of two concave surfaces (which are spherical surfaces) of the lens 502. For the main optical axis of the second optical lens assembly 50b, refer to the foregoing description about the main optical axis of the first optical lens assembly 50a.

The light adjustment assembly 10 is located on a side that is of the first optical lens assembly 50a and the second optical lens assembly 50b and that is away from the periscope reflector 40 (that is, a side in the x direction). The light adjustment assembly 10 includes a first optical path folding element 11, a second optical path folding element 12, and a third optical path folding element 13 that are successively arranged along a y-axis negative direction.

The first optical path folding element 11 includes N1 flat plate-shaped plane mirrors that are arranged along the x-axis direction, where N1 is a positive integer. In FIG. 2a, N1=2, for example, the first optical path folding element 11 includes a plane mirror 11i and a plane mirror 11j. The plane mirror 11i has two opposite surfaces. A surface facing the second optical path folding element 12 is a first reflective surface 1a. The first reflective surface 1a may be formed by coating with a reflective material. In addition, for example, the first reflective surface 1a is perpendicular to the surface of the bottom wall 63. An included angle between the first reflective surface 1a and the main optical axis of the first optical lens assembly 50a is denoted as α1 (not shown in the figure). An included angle between a first reflective surface 1b and the main optical axis of the first optical lens assembly 50a is denoted as α2 (not shown in the figure). Both α1 and α2 may be acute angles, for example, between 30° and 75°, for example, 30°, 45°, and 75°. α1 and α2 may be equal or unequal, for example, in FIG. 2a, α1=45°. In this case, a light outlet of the first optical lens assembly 50a is disposed opposite to the first reflective surface 1a. Similarly, the plane mirror 11j has two opposite surfaces. A surface facing the second optical path folding element 12 is a first reflective surface 1b. The plane mirror 11i and the plane mirror 11j form a structure with a roughly "V"-shaped cross section. The first reflective surface 1a is connected to the first reflective surface 1b (that is, the first reflective surface 1a and the first reflective surface 1b are consecutively disposed, and a similar explanation is given for the following "connection", which is not described again). An included angle thereof is θ1, where θ1 meets: 60°≤θ1≤120°, and θ1 may be specifically 60°, 75°, 90°, 105°, or 120°. In FIG. 2a, for example, θ1=90°. For another disposing of the plane mirror 11j, refer to disposing of the plane mirror 11i.

Similar to the first optical path folding element 11, the second optical path folding element 12 also includes N2 flat plate-shaped plane mirrors arranged along the x-axis direction, where N2 is a positive integer. In FIG. 2a, N2=2, that is, the second optical path folding element 12 includes a plane mirror 12i and a plane mirror 12j. The plane mirror 12i and the plane mirror 12j also form a structure with a roughly "V"-shaped cross section. Different from the first optical path folding element 11, both surfaces of the plane mirror 12i have a reflection function. One surface facing the first optical path folding element 11 is a second reflective surface 2a, and the other surface facing the third optical path folding element 13 is a third reflective surface 3a. Both surfaces of the plane mirror 12j also have a reflection function. One surface is a second reflective surface 2b and the other surface is a third reflective surface 3b. The second reflective surface 2a is connected to the second reflective surface 2b, and an included angle θ2 meets: 60°≤θ2≤120°. θ2 may be specifically 60°, 75°, 90°, 105°, or 120°. In FIG. 2a, for example, θ2=90°. The third reflective surface 3a is connected to the third reflective surface 3b. An included angle thereof is θ3, where θ3 meets: 60°≤θ3≤120°, and θ3 may be specifically 60°, 75°, 90°, 105°, or 120°. In FIG. 2a, for example, θ3=θ2=90°. An included angle between the second reflective surface 2a and the main optical axis of the first optical lens assembly 50a is denoted as β1 (not shown in the figure). An included angle between the second reflective surface 2b and the main optical axis of the first optical lens assembly 50a is denoted as β2 (not shown in the figure). Both β1 and β2 may be acute angles, for example, between 30° and 75°, for example, 30°, 45° and 75°. β1 and β2 may be equal or unequal, for example, in FIG. 2a, β1=β2=45°. An included angle between the third reflective surface 3a and the main optical axis of the second optical lens assembly 50b is denoted as γ1 (not shown in the figure). An included angle between the third reflective surface 3b and the main optical axis of the second optical lens assembly 50b is denoted as γ2 (not shown in the figure). Both γ1 and γ2 may be acute angles, for example, between 30° and 75°, for example, 30°, 45° and 75°. γ1 and γ2 may be equal or unequal, for example, in FIG. 2a, γ1=γ2=45°. In this case, a light outlet of the second optical lens assembly 50b is disposed opposite to the third reflective surface 3a.

The third optical path folding element 13 also includes N3 flat plate-shaped plane mirrors arranged along the x-axis direction, where N3 is a positive integer. In FIG. 2a, N3=2, that is, the third optical path folding element 13 includes a plane mirror 13i and a plane mirror 13j. The plane mirror 13i and the plane mirror 13j also form a structure with a roughly "V"-shaped cross section. A surface of the plane mirror 13i facing the second optical path folding element 12 is a fourth reflective surface 4a. A surface of the plane mirror 13j facing the second optical path folding element 12 is a fourth reflective surface 4b. The fourth reflective surface 4a is connected to the fourth reflective surface 4b. In addition, an included angle θ4 is formed, where θ4 meets: 60°≤θ4≤120°, and θ4 may be specifically 60°, 75°, 90°, 105°, or 120°. In FIG. 2a, for example, θ4=90°. An included angle between the fourth reflective surface 4a and the main optical axis of the second optical lens assembly 50b is denoted as δ1 (not shown in the figure). An included angle between the fourth reflective surface 4b and the main optical axis of the second optical lens assembly 50b is denoted as δ2 (not shown in the figure). Both δ1 and δ2 may be acute angles, for example, between 30° and 75°, for example, 30°, 45° and 75°. δ1 and δ2 may be equal or unequal, for example, in FIG. 2a, δ1=δ2=45°.

Still refer to FIG. 2a to FIG. 2c. The first image sensor 20a is located on a side that is of the first optical path folding element 11 and the second optical path folding element 12 and that is away from the first optical lens assembly 50a, and a lighting surface thereof faces the first reflective surface 1b. In FIG. 2a, for example, the lighting surface of the first image sensor 20a is perpendicular to the surface of the bottom wall 63 and is perpendicular to the main optical axis of the first optical lens assembly 50a. Similarly, the second image sensor 20b is located on a side that is of the second optical path folding element 12 and the third optical path folding element 13 and that is away from the second optical lens assembly 50b, and a lighting surface thereof faces the third reflective surface 3b. In FIG. 2a, for example, the lighting surface of the second image sensor 20b is perpendicular to the surface of the bottom wall 63 and is perpendicular to the main optical axis of the first optical lens assembly 50a.

A zoom magnification of the first optical lens assembly 50a may be 7×, and a zoom magnification of the second optical lens assembly 50b may be 12×.

The following describes a light transmission path in the camera module shown in FIG. 2a to FIG. 2c.

With reference to FIG. 2a to FIG. 2c, when the camera module 01 is configured to perform a photographing (or video recording) function on a photographed object, light from the photographed object is irradiated along a direction basically parallel to the z-axis to the periscope reflector 40, and then is reflected by the periscope reflector 40 to the light inlet of the first optical lens assembly 50a and the light inlet of the second optical lens assembly 50b. The photographed object may be an object that reflects light, for example, a person, a building, a plant, or an animal, or may be an object that has a self-luminous function, for example, the moon or a lamp.

Light obtained after passing through the first optical lens assembly 50a is emitted to the first reflective surface 1a of the first optical path folding element 11, then, is reflected to the second reflective surface 2a of the second optical path folding element 12 through the first reflective surface 1a, then, is reflected to the second reflective surface 2b through the second reflective surface 2a, then, is reflected to the first reflective surface 1b through the second reflective surface 2b, and then is reflected to the lighting surface of the first image sensor 20a through the first reflective surface 1b. The first image sensor 20a processes received light as an electrical signal with image information of the photographed object, to complete photographing (or video recording) of the photographed object. After the light is reflected for a plurality of times between the first optical path folding element 11 and the second optical path folding element 12, an optical path of the light is folded. That is, after the light is transmitted from the light outlet of the first optical lens assembly 50a, the light is not emitted along a straight line to the lighting surface of the first image sensor 20a, but the optical path is folded into a curved shape. In this way, an optical path between the first optical lens assembly 50a and the first image sensor 20a is extended in a limited space, so that the first optical lens assembly 50a has a high optical zoom magnification. Alternatively, when it is ensured that the first optical lens assembly 50a and the first image sensor 20a have a high optical zoom magnification, a straight line length between the first optical lens assembly 50a and the first image sensor 20a can be shortened, thereby reducing a size of the camera module.

Similarly, light obtained after passing through the second optical lens assembly 50b is emitted to the third reflective surface 3a of the second optical path folding element 12, then, is reflected to the fourth reflective surface 4a of the third optical path folding element 13 through the third reflective surface 3a, then, is reflected to the fourth reflective surface 4b through the fourth reflective surface 4a, then, is reflected to the third reflective surface 3b through the fourth reflective surface 4b, and then is reflected to the lighting surface of the second image sensor 20b through the third reflective surface 3b. The second image sensor 20b processes received light as an electrical signal with image information of the photographed object, to complete photographing (or video recording) of the photographed object. The second optical path folding element 12 cooperates with the third optical path folding element 13 to implement optical path folding on light transmitted from the second optical lens assembly 50b. For an effect analysis of content in this paragraph, refer to analysis of the first optical lens assembly 50a, the first optical path folding element 11, and the second optical path folding element 12 in the previous paragraph.

In the embodiments corresponding to FIG. 2a to FIG. 2c, optical path folding is performed on the light from the first optical lens assembly 50a and the light from the second optical lens assembly 50b. The second optical path folding element 12 is shared to separately cooperate with the first optical path folding element 11 and the third optical path folding element 13, so that there is no need to separately pair one optical path folding element for the first optical path folding element 11 and the third optical path folding element 13, which is equivalent to saving one optical path folding element. This reduces costs, and also reduces an internal space of the camera module 01, thereby facilitating further miniaturization of the camera module 01.

In addition, to further miniaturize the camera module 01, a part of a structure of the first optical path folding element 11, for example, a joint between the plane mirror 11i and the plane mirror 11j, may be further matched to an area between the plane mirror 12i and the plane mirror 12j. Correspondingly, a joint between the plane mirror 12i and the plane mirror 12j may also be correspondingly matched to an area between the plane mirror 13i and the plane mirror 13j.

Figure 2D:
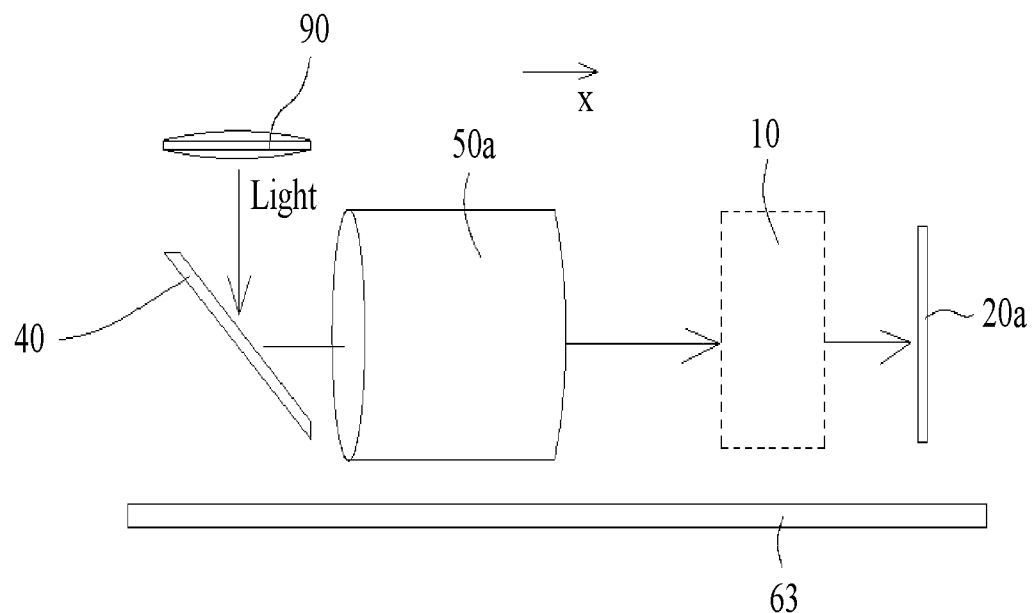

To further clearly express a periscope reflection principle of the periscope reflector 40, FIG. 2d shows a transmission path of light passing through the first optical lens assembly 50a. With reference to FIG. 2d, the periscope reflector 40 is a plane mirror, and external ambient light is reflected from the periscope reflector 40 to the first optical lens assembly 50a, and is transmitted to the light adjustment assembly 10 through the first optical lens assembly 50a. After being folded by the light adjustment assembly 10, the light is emitted to the first image sensor 20a. The periscope reflector 40 reflects and deflects the light, so that the first optical lens assembly 50a can be arranged along the x-axis direction instead of a direction perpendicular to the x-axis direction, thereby reducing a thickness of the camera module 01. In addition, to implement that the light from the photographed object is first better focused on the periscope reflector 40, and then is reflected by the periscope reflector 40, two focusing lenses 90 may be added in a light incident direction of the periscope reflector 40. The two focusing lenses 90 respectively correspond to locations of the first optical lens assembly 50a and the second optical lens assembly 50b. Light passing through one focusing lens 90 is reflected by the periscope reflector 40 to the first optical lens assembly 50a, and light passing through the other focusing lens 90 is reflected by the periscope reflector 40 to the second optical lens assembly 50b.

Figure 2E:
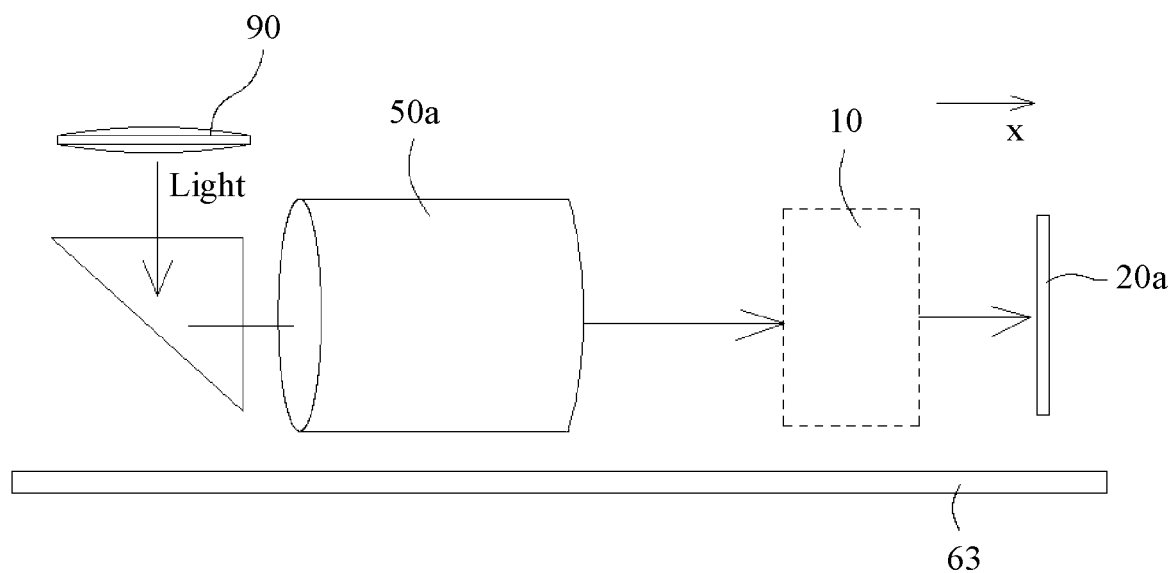
FIG. 2e shows a variation of FIG. 2d.

FIG. 2e shows a variation of FIG. 2d. In FIG. 2e, the periscope reflector 40 formed by the plane mirror is replaced with a right-angle triangular prism. For example, one right-angle surface of the right-angle triangular prism is parallel to the surface of the bottom wall 63 and away from the bottom wall 63. It should be understood that, "parallel" herein refers to substantially parallel, that is, for a person skilled in the art, "parallel" may be absolutely parallel, or there may be an included angle. The other right-angle surface is perpendicular to the surface of the bottom wall 63, and faces the first optical lens assembly 50a and the second optical lens assembly 50b. A bevel between the two right-angle surfaces is disposed at a same angle and a same location as a reflective surface of the periscope reflector 40 in FIG. 2d. Light is emitted to the right-angle triangular prism from the surface parallel to the bottom wall 63, and is reflected through an inner side of the bevel, and the reflected light is vertically emitted to the first optical lens assembly 50a through the other right-angle surface. The so-called "right-angle surface" in this paragraph is explained as follows: In three side surfaces in the right-angle triangular prism that are connected to a top surface and a bottom surface, two side surfaces are perpendicular to each other, the third side surface is connected to the two mutually perpendicular side surfaces, and any one of the two mutually perpendicular side surfaces is referred to as the right-angle surface of the right-angle triangular prism.

Back to FIG. 2c, the camera module 01 may further include an optical image stabilization (optical image stabilization, OIS) motor 80. The optical image stabilization motor 80 is drivingly connected to the periscope reflector 40. The optical image stabilization motor 80 drives, based on detected jitter information, the periscope reflector 40 to move along a direction opposite to the foregoing jitter, to perform jitter compensation on the light emitted to the periscope reflector 40, so that the light reflected by the periscope reflector 40 is reflected as accurately as possible to the first optical lens assembly 50a and the second optical lens assembly 50b, thereby improving imaging quality.

The first optical lens assembly 50a and the second optical lens assembly 50b share one periscope reflector 40. Therefore, only one optical image stabilization motor 80 is required to perform jitter compensation, which helps reduce costs.

In addition, a light shielding plate 62 is further provided between the first optical lens assembly 50a and the second optical lens assembly 50b. The light shielding plate 62 may extend from the periscope reflector 40 to a vicinity of the second optical path folding element 12, so that the light transmitted from the first optical lens assembly 50a is emitted to the second image sensor 20b, and the light transmitted from the second optical lens assembly 50b is prevented from being emitted to the first image sensor 20a.

It should be noted that, the light transmitted from the first optical lens assembly 50a cannot be clearly imaged only by irradiating to the lighting surface of the first image sensor 20a, and corresponding adjustment is required to focus the light on the lighting surface of the first image sensor 20a. Specifically, for example, a location of the first optical lens assembly 50a may be adjusted along a direction of the main optical axis of the first optical lens assembly 50a based on different distances of the photographed object. Alternatively, a location of the first image sensor 20a may be adjusted (for example, adjusted along the x-axis direction), to control a length (an image distance) of an optical path from the light outlet of the first optical lens assembly 50a to the first image sensor 20a. A location of the second optical lens assembly 50b and a location of the second image sensor 20b may be adjusted in a similar manner to achieve a same purpose.

However, the foregoing manner of adjusting the image distance is merely an example. This embodiment of this application further provides another manner of adjusting the image distance.

Figure 4A:
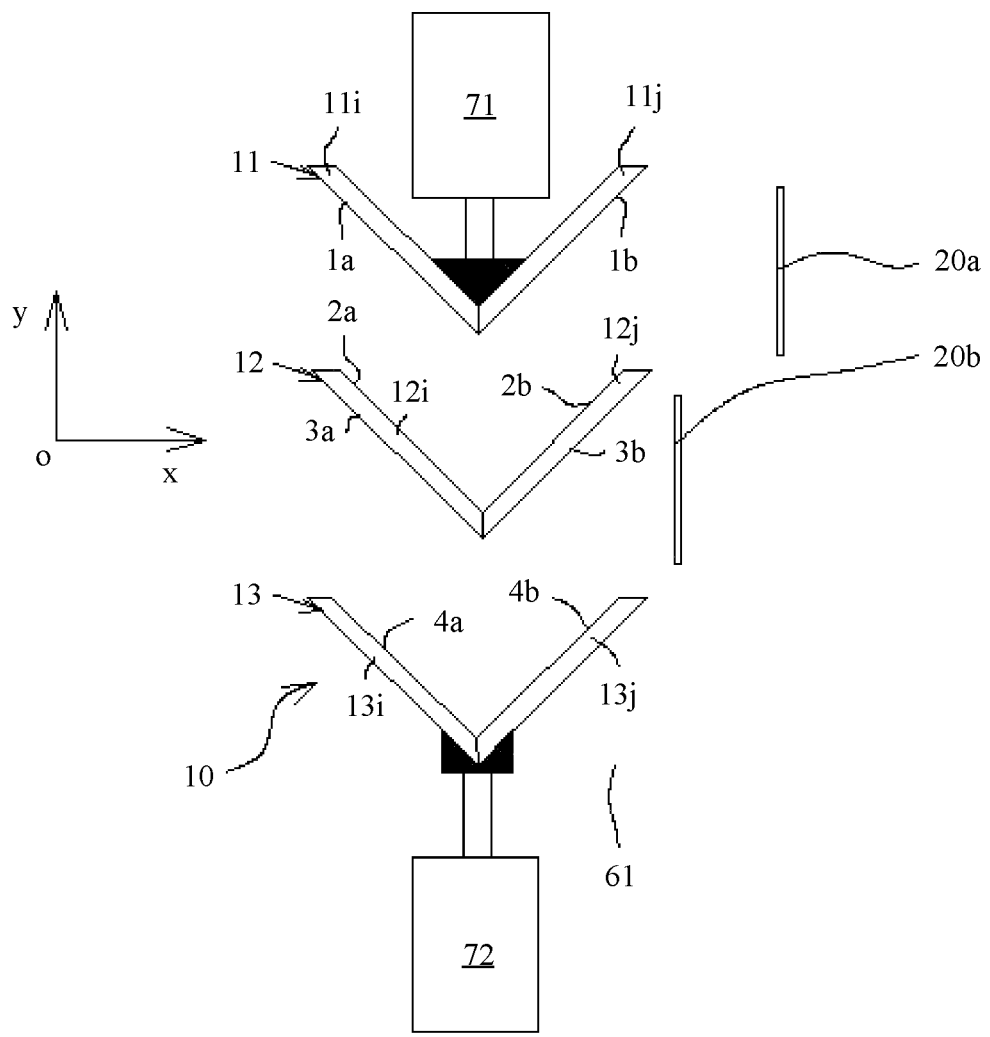
FIG. 4a is a schematic diagram of cooperation between a light adjustment assembly and a drive assembly in embodiments corresponding to FIG. 2a to FIG. 2c.

FIG. 4a is a schematic diagram of cooperation between a light adjustment assembly and a drive assembly in the embodiments corresponding to FIG. 2a to FIG. 2c. The drive assembly is not shown in FIG. 2a to FIG. 2c. With reference to FIG. 4a, the drive assembly includes a first drive motor 71 and a second drive motor 72. Both the first drive motor 71 and the second drive motor 72 may be auto-focus (auto-focus, AF) motors. An output end of the first drive motor 71 is drivingly connected to the first optical path folding element 11 to drive the first optical path folding element 11 to move back and forth along the y-axis direction, to adjust a distance between the first reflective surface 1a and the second reflective surface 2a, and a distance between the first reflective surface 1b and the second reflective surface 2b, so that an optical path folding degree of the light transmitted from the first optical lens assembly 50a changes, and the image distance changes with the optical path folding degree. Based on photographed objects at different distances (that is, different object distances), the first drive motor 71 drives the first optical path folding element 11 to be close to or away from the second optical path folding element 12, so that folded light is focused on the lighting surface of the first image sensor 20a. For example, when the first optical path folding element 11 is close to the second optical path folding element 12, an optical path is shortened, or when the first optical path folding element 11 is away from the second optical path folding element 12, the optical path is lengthened. Similarly, an output end of the second drive motor 72 is drivingly connected to the third optical path folding element 13, to drive the third optical path folding element 13 to be close to or away from the second optical path folding element 12, so that the light transmitted from the second optical lens assembly 50b is focused on the lighting surface of the second image sensor 20b.

In the focusing manner shown in FIG. 4a, the first optical path folding element 11 and the third optical path folding element 13 are separately driven. Therefore, the first optical lens assembly 50a and the second optical lens assembly 50b may simultaneously focus. However, one of the two may focus first, and then the other may focus.

In addition, the first drive motor 71 drives only the first optical path folding element 11, so that only a travel range of the first optical path folding element 11 needs to be considered. Similarly, for the second drive motor 72, only a travel range of the third optical path folding element 13 needs to be considered. Therefore, travel requirements on the first drive motor 71 and the second drive motor 72 are low.

In addition, in the foregoing adjustment process, the second optical path folding element 12 does not move, to accurately control a distance between the first optical path folding element 11 and the second optical path folding element 12, and a distance between the third optical path folding element 13 and the second optical path folding element 12. However, to speed up adjustment, the second optical path folding element 12 may also be driven simultaneously.

Back to FIG. 2a to FIG. 2c, the camera module 01 further includes a flexible circuit board 30. The flexible circuit board 30 penetrates the bottom of the enclosure wall 61 to the housing, and is electrically connected to the first drive motor 71 and the second drive motor 72, to provide control signals and electric energy for the first drive motor 71 and the second drive motor 72.

Figure 4B:
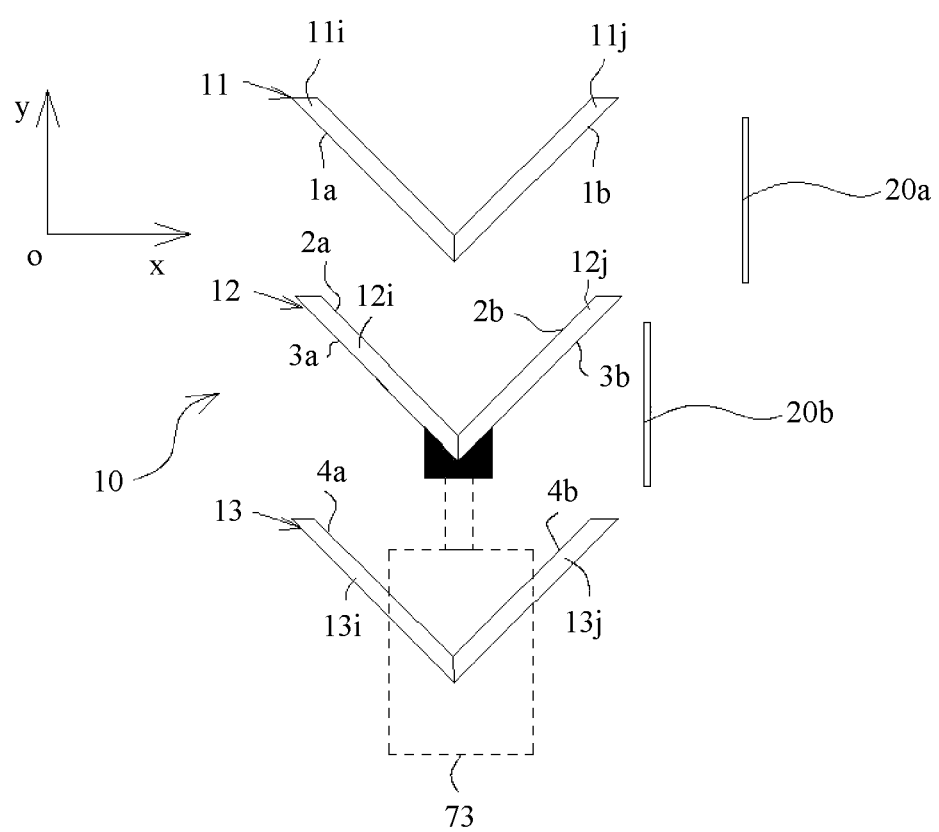
FIG. 4b is another schematic diagram of cooperation between a light adjustment assembly and a drive assembly in embodiments corresponding to FIG. 2a to FIG. 2c.

FIG. 4b is a schematic diagram of cooperation between a light adjustment assembly and a drive assembly in the embodiments corresponding to FIG. 2a to FIG. 2c. The drive assembly is not shown in FIG. 2a to FIG. 2c. Different from that in the embodiment corresponding to FIG. 4a, the drive assembly includes a third drive motor 73. An output end of the third drive motor 73 is drivingly connected to the second optical path folding element 12, and is configured to drive the second optical path folding element 12 to move along the y-axis direction between the first optical path folding element 11 and the third optical path folding element 13. This enables the second optical path folding element 12 to be close to the first optical path folding element 11 and away from the third optical path folding element 13, or to be close to the third optical path folding element 13 and away from the first optical path folding element 11. For example, when the first optical lens assembly 50a is first used to focus, the third drive motor 73 may first drive the distance between the second optical path folding element 12 and the first optical path folding element 11 to a specified distance, so that the light transmitted from the first optical lens assembly 50a is focused on the first image sensor 20a. After the first image sensor 20a reaches a specified exposure time, the third drive motor 73 then drives the distance between the second optical path folding element 12 and the third optical path folding element 13 to a specified distance, so that the light transmitted from the second optical lens assembly 50b is focused on the second image sensor 20b. The first optical lens assembly 50a may be a color camera lens, and the second optical lens assembly 50b may be a black and white camera lens. To prevent the third drive motor 73 from blocking the light, the third drive motor 73 may be disposed on an upper layer in a z-axis positive direction or an upper layer in a z-axis negative direction of the second optical path folding element 12. Alternatively, the third drive motor 73 may be disposed on a side that is of the third optical path folding element 13 and that is away from the second optical path folding element 12. The output end of the third drive motor 73 bypasses the third optical path folding element 13 and is drivingly connected to the second optical path folding element 12 by using a drive member. Therefore, the third drive motor 73 and the second optical path folding element 12 do not need to be disposed at different layers, to ensure that the camera module 01 has a small thickness in the z-axis direction.

In the embodiment shown in FIG. 4b, focusing of the first optical lens assembly 50a and the second optical lens assembly 50b can be sequentially completed by disposing only one motor, that is, the third drive motor 73, thereby further reducing a volume of the camera module 01 and also reducing costs.

The third drive motor 73 also obtains a control signal and electric energy by using the flexible circuit board 30.

The embodiments corresponding to FIG. 2a to FIG. 4b are merely examples, and the light adjustment assembly 10 in the camera module 01 may have a plurality of variations. The following describes some examples.

Figure 5A:
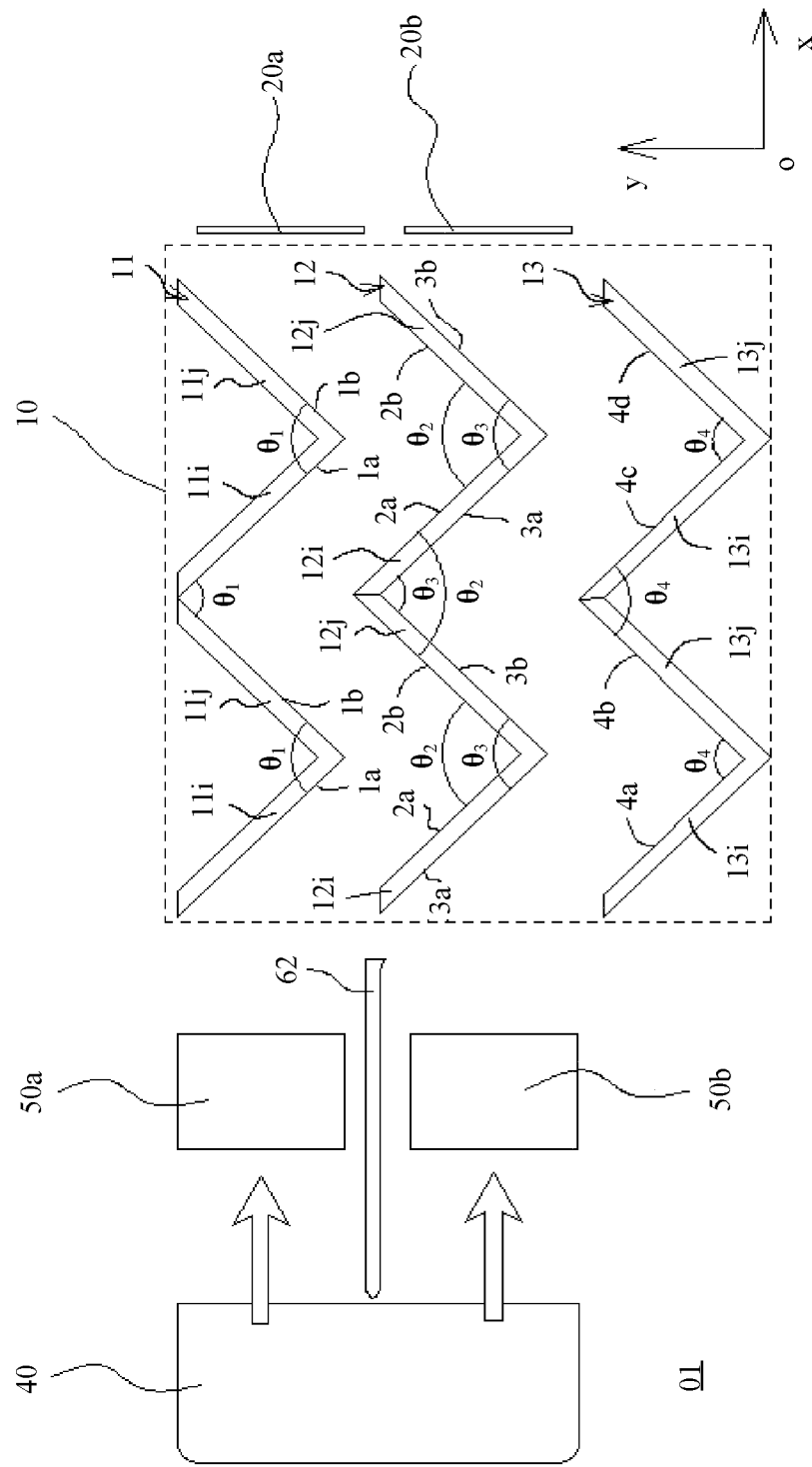

FIG. 5a shows a variation of the camera module shown in FIG. 2a. For brevity, the housing and the flexible circuit board 30 in FIG. 2a are not shown (not meaning that they are absent) in FIG. 5a. A difference between the camera module 01 shown in FIG. 5a and that in the embodiments corresponding to FIG. 2a to FIG. 2c lies in that the first optical path folding element 11 includes two groups of "V"-shaped structures in FIG. 2a that are formed by the plane mirror 11i and the plane mirror 11j. In addition, a latter group (namely, a group away from the first optical lens assembly 50a) of "V"-shaped structure may be considered as being formed by a former group (namely, a group close to the first optical lens assembly 50a) of "V"-shaped structure after translating along the x-axis direction, and a free end of the plane mirror 11j in the former group of "V"-shaped structure is connected to a free end of the plane mirror 11i in the latter group of "V"-shaped structure. An included angle between the first reflective surface 1b in the former group of "V"-shaped structure and the first reflective surface 1a in the latter group of "V"-shaped structure is θ1.

In a similar manner, the second optical path folding element 12 also includes two groups of "V"-shaped structures that are arranged along the x direction and connected to each other, and the third optical path folding element 13 also includes two groups of "V"-shaped structures that are arranged along the x direction and connected to each other.

A transmission path of the light transmitted from the first optical lens assembly 50a is as follows: the 1st first reflective surface 1a, the first second reflective surface 2a, the first second reflective surface 2b, the 1st first reflective surface 1b, the second first reflective surface 1a, the 2nd second reflective surface 2a, the 2nd second reflective surface 2b, and the second first reflective surface 1b. Then, the light is transmitted to the first image sensor 20a by the second first reflective surface 1b. A transmission path of the light transmitted from the second optical lens assembly 50b is as follows: the first third reflective surface 3a, the first fourth reflective surface 4a, the first fourth reflective surface 4b, the first third reflective surface 3b, the second third reflective surface 3a, the second fourth reflective surface 4a, the second fourth reflective surface 4b, and the second third reflective surface 3b. Then, the light is transmitted to the second image sensor 20b by the second third reflective surface 3b. In this paragraph, an "$m^{th}$ $n^{th}$ reflective surface" refers to an $m^{th}$ $n^{th}$ reflective surface along the x-axis direction, where both m and n are positive integers.

A length of an optical path from the first optical lens assembly 50a to the first image sensor 20a, and a length of an optical path from the second optical lens assembly 50b to the second image sensor 20b are further extended in the manner shown in FIG. 5a. It should be understood that, a quantity of "V"-shaped structures included in each of the first optical path folding element 11, the second optical path folding element 12, and the third optical path folding element 13 is an example. The quantity of "V"-shaped structures may be set to one or more based on a requirement. In addition, for a disposing manner of every two adjacent "V"-shaped structures, refer to the manner in FIG. 5a. In the foregoing manner of increasing the quantity of "V"-shaped structures, the length of the optical path from the first optical lens assembly 50a to the first image sensor 20a, and the length of the optical path from the second optical lens assembly 50b to the second image sensor 20b are extended, and a direction of light emitted from the light adjustment assembly 10 remains unchanged.

Figure 5B:
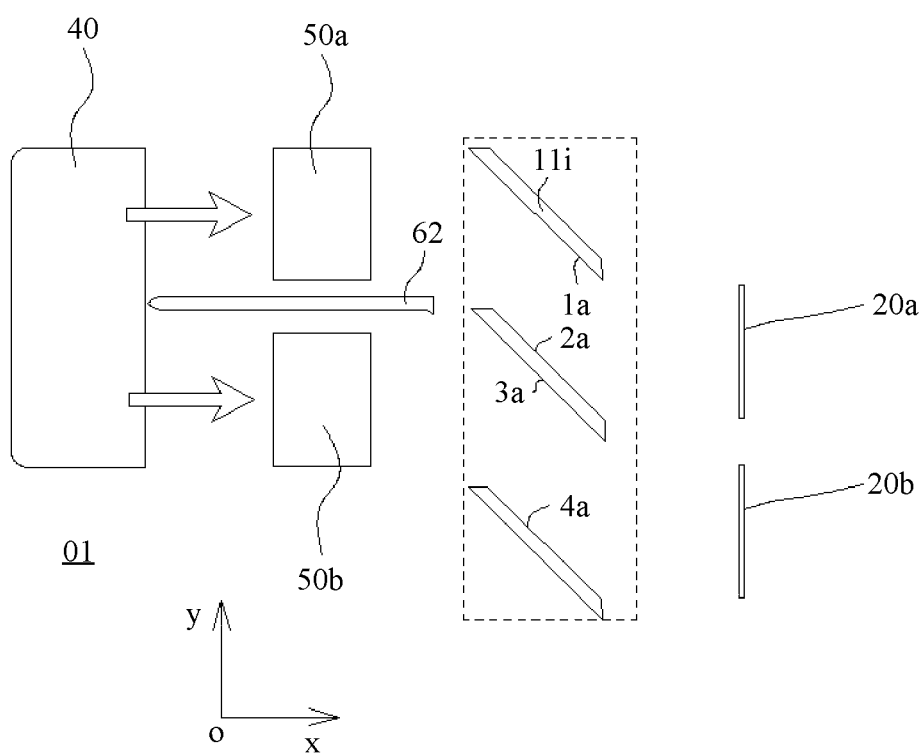

FIG. 5b shows another variation of the camera module shown in FIG. 2a. In comparison with FIG. 2a, the plane mirror 11j, the plane mirror 12j, and the plane mirror 13j are removed in an embodiment shown in FIG. 5b. A path of the light transmitted from the first optical lens assembly 50a is: the first reflective surface 1a, the second reflective surface 2a, and the first image sensor 20a. A path of the light transmitted from the second optical lens assembly 50b is: the third reflective surface 3a, the fourth reflective surface 4a, and the second image sensor 20b.

Figure 6:
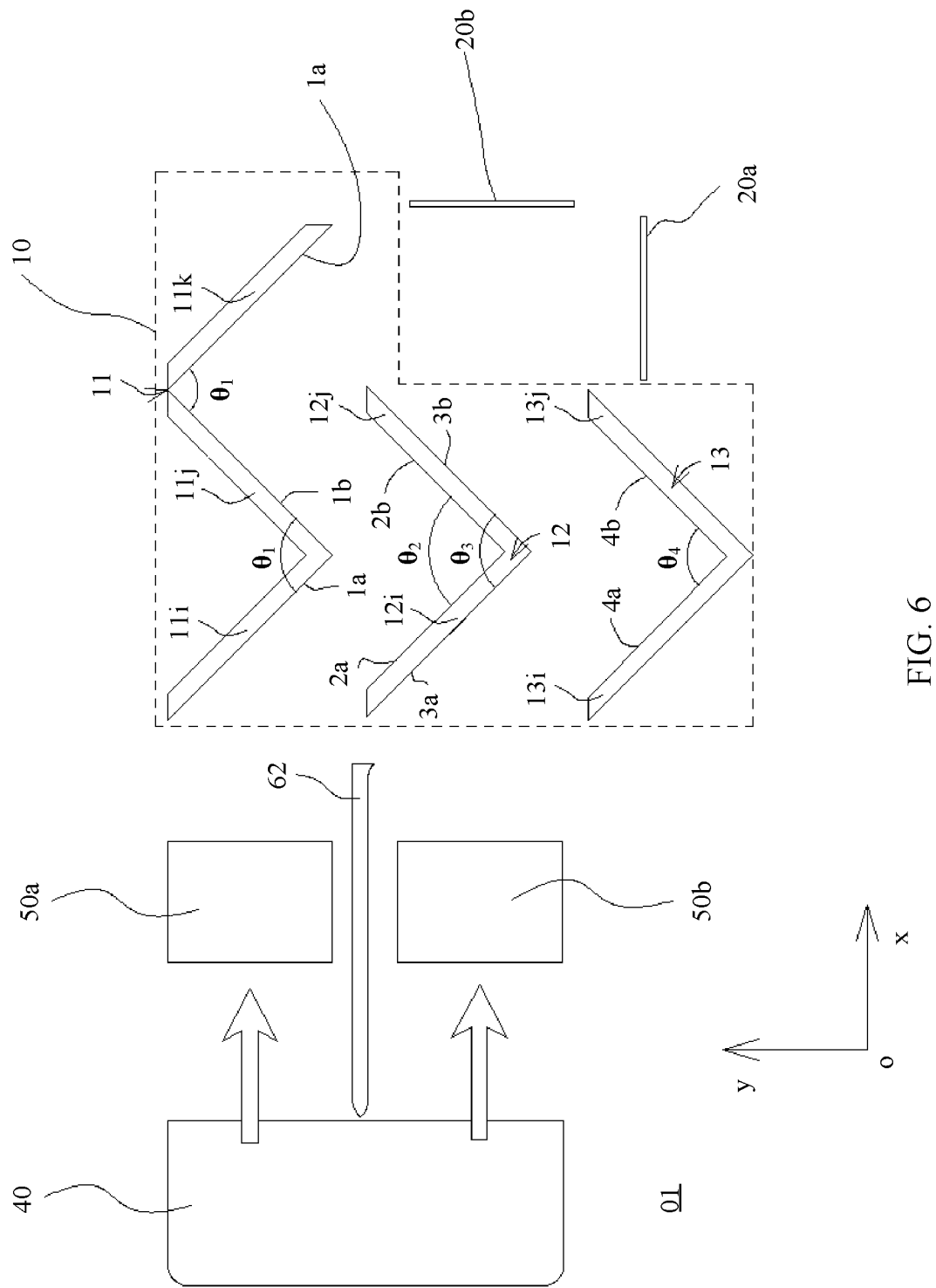

FIG. 6 shows another variation of the camera module shown in FIG. 2a. A difference between the camera module 01 shown in FIG. 6 and the camera module 01 shown in FIG. 2a lies in that the first optical path folding element 11 further includes a plane mirror 11k, where the plane mirror 11k has two opposite surfaces. One of the surfaces is a first reflective surface 1a (for example, the second first reflective surface 1a along the x-axis positive direction). The second first reflective surface 1a is connected to the first reflective surface 1b, an included angle between the second first reflective surface 1a and the first reflective surface 1b is θ1. The first image sensor 20a is located in a negative direction of the plane mirror 11k, and for example, the lighting surface of the first image sensor 20a is basically perpendicular to the y-axis. Based on a light transmission path in the light adjustment assembly 10 shown in FIG. 2a, the light is reflected from the first reflective surface 1b to the second first reflective surface 1a, and is reflected from the second first reflective surface 1a to the lighting surface of the first image sensor 20a. Therefore, based on the light adjustment assembly 10 shown in FIG. 2a, in the light adjustment assembly 10 shown in FIG. 5a, the length of the optical path from the first optical lens assembly 50a to the first image sensor 20a is extended. In addition, the first image sensor 20a is not successively arranged with the first optical lens assembly 50a and the light adjustment assembly 10 along a vertical direction (the y-axis direction), but is horizontally arranged along the x-axis negative direction, thereby reducing a vertical length of the camera module 01, and fully using a horizontal length of the camera module 01. This facilitates miniaturization of the camera module 01.

Figure 7:
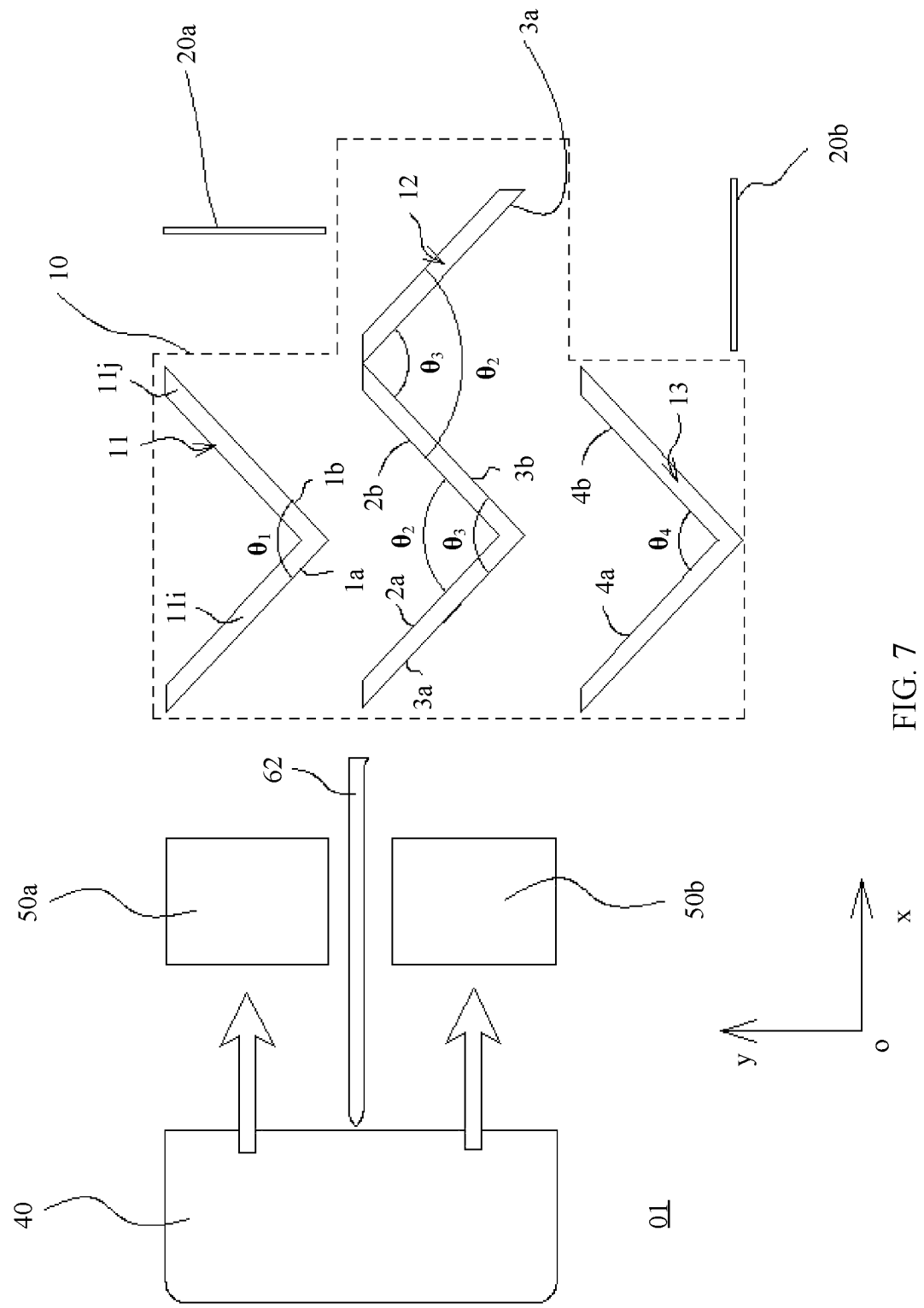

FIG. 7 shows another variation of the camera module shown in FIG. 2a. With reference to FIG. 7, similar to FIG. 6, based on FIG. 2a, one plane mirror (having the second third reflective surface 3a which has an included angle θ2 with the first third reflective surface 3b) is added to the second optical path folding element 12 in the x-axis positive direction. In addition, the second image sensor 20b is transferred to a y-axis negative direction of the plane mirror. The plane mirror is configured to reflect the light, reflected to the first third reflective surface 3b, along the horizontal direction (the x-axis negative direction) to the second image sensor 20b. An effect similar to that of FIG. 6 can be achieved.

In the foregoing manners of FIG. 6 and FIG. 7, one plane mirror may be added in the x-axis positive direction of each of the first optical path folding element 11 and the second optical path folding element 12. In addition, two surfaces of the plane mirror added to the second optical path folding element 12 are reflective surfaces (where one is the second reflective surface and the other is the third reflective surface). A location of the second image sensor 20b is correspondingly adjusted, so that a purpose similar to that of FIG. 6 can also achieved.

Figure 8:
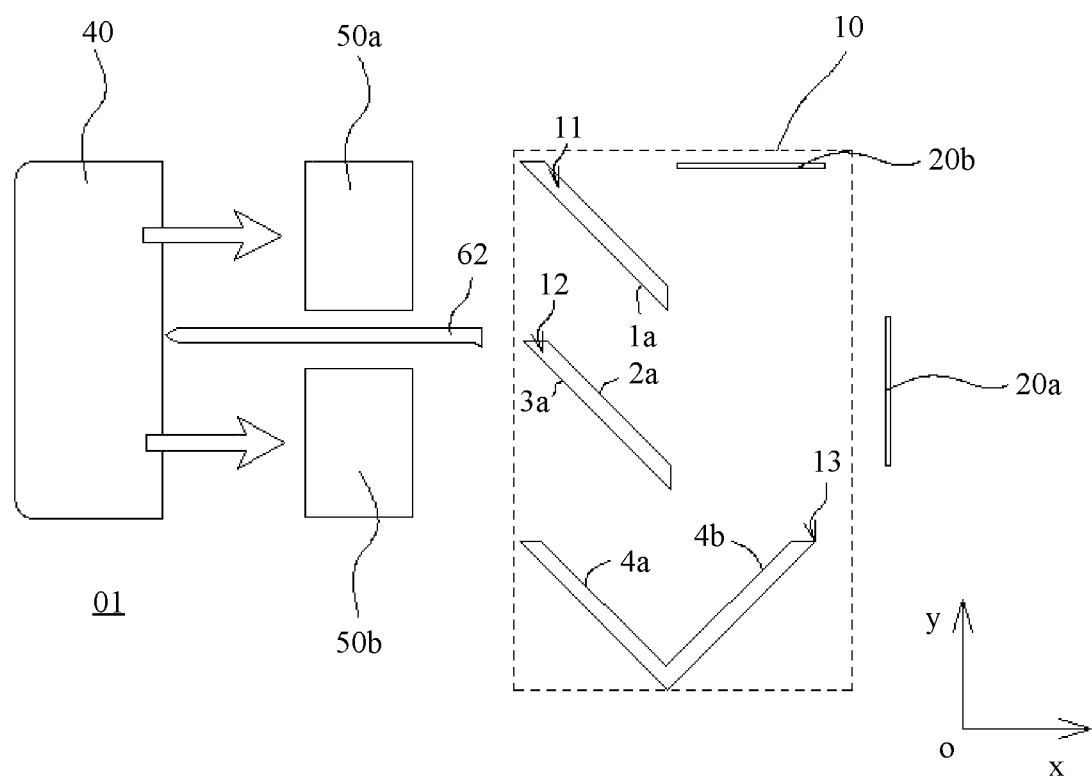

Alternatively, FIG. 8 shows another variation of the camera module shown in FIG. 2a. With reference to FIG. 8, based on the embodiment shown in FIG. 2a, the plane mirror 11j and the plane mirror 12j are removed, and locations of the first image sensor 20a and the second image sensor 20b are correspondingly adjusted. The lighting surface of the second image sensor 20b is opposite to the fourth reflective surface 4b, so that an effect similar to that of FIG. 6 can also be achieved.

In the embodiments corresponding to FIG. 6 to FIG. 8, the optical path can be extended in the horizontal (the x-axis direction) size. However, this is merely an example. For a cooperation relationship between the first optical path folding element 11 and the second optical path folding element 12, to achieve the purpose of extending the optical path by using the horizontal size, only the following needs to be met:

|M1−M2|=1, where M1 is a quantity of first reflective surfaces on the first optical path folding element 11, M2 is a quantity of second reflective surfaces on the second optical path folding element 12, and both M1 and M2 are positive integers. When M1>M2, the last first reflective surface (for example, the second first reflective surface 1a along the x-axis positive direction in FIG. 6) is bent in a direction toward the second optical path folding element, and is configured to reflect light from a first reflective surface (for example, the 1st first reflective surface 1b along the x-axis positive direction in FIG. 6) previous to the last first reflective surface to the first image sensor along a first direction, where the first direction (for example, the y-axis negative direction in FIG. 6) is a direction in which the first optical path folding element points to the third optical path folding element, and the last first reflective surface is a first reflective surface farthest from the first optical lens assembly; or when M1<M2, the last second reflective surface is bent in a direction toward the first optical path folding element, and is configured to reflect light from a second reflective surface previous to the last second reflective surface to the first image sensor along a second direction, where the second direction is a direction in which the third optical path folding element points to the first optical path folding element.

For a cooperation relationship between the second optical path folding element 12 and the third optical path folding element 13, to achieve the purpose of extending the optical path by using the horizontal size, only the following needs to be met:

|M3−M4|=1, where M3 is a quantity of third reflective surfaces on the second optical path folding element 12, M4 is a quantity of fourth reflective surfaces on the third optical path folding element 13, and both M3 and M4 are positive integers. When M3>M4, the last third reflective surface (for example, the second first reflective surface 3a along the x-axis positive direction in FIG. 7) is bent in a direction toward the third optical path folding element, and is configured to reflect light from a third reflective surface (for example, the 1st first reflective surface 3b along the x-axis positive direction in FIG. 7) previous to the last third reflective surface to the second image sensor along the first direction (for example, the y-axis negative direction in FIG. 7), where the first direction is a direction in which the first optical path folding element points to the third optical path folding element; or when M3<M4, the last fourth reflective surface (for example, the first fourth reflective surface 4b along an x-axis positive direction in FIG. 8) is bent in a direction toward the third optical path folding element, and is configured to reflect light from an M3$^{th}$ fourth reflective surface to the second image sensor along the second direction (for example, a y-axis positive direction in FIG. 8), where the second direction is a direction in which the third optical path folding element points to the first optical path folding element.

In the embodiments corresponding to FIG. 2a to FIG. 8, each second optical path folding element 12 includes a plurality of plane mirrors successively connected along the x-axis direction. In addition, one second reflective surface is formed on a surface of each plane mirror facing the first optical path folding element 11, and one third reflective surface is formed on a surface thereof facing the third optical path folding element 13. However, this is merely an example, and the second optical path folding element 12 may include at least one plane mirror.

In addition, in the foregoing embodiment, the quantity M2 of second reflective surfaces is equal to the quantity M3 of third reflective surfaces. In addition, the M2 second reflective surfaces are in a one-to-one correspondence with the M3 third reflective surfaces, and each group of the second reflective surface and the third reflective surface that correspond to each other are disposed back-to-back and parallel to each other. It should be understood that, "disposed back-to-back" herein means that the second reflective surface and the third reflective surface are located on opposite sides of a medium, locations thereof are oppositely disposed, and directions thereof are opposite. "Parallel" herein refers to substantially parallel, that is, for a person skilled in the art, "parallel" may be absolutely parallel, or there may be an included angle (for example, an angle error within a range of ±3°). However, this is merely an example.

Figure 9:
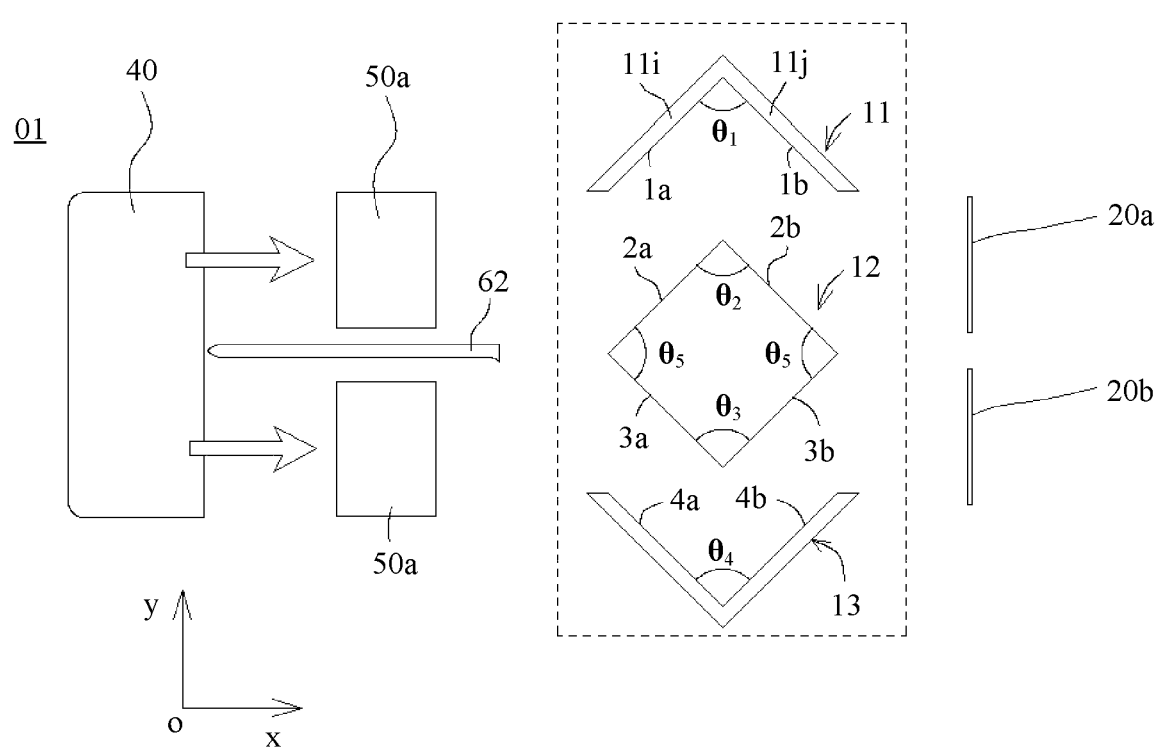
FIG. 9 is a top view of another camera module according to an embodiment of this application.

FIG. 9 is a top view of another camera module according to an embodiment of this application. A difference between a camera module 01 shown in FIG. 9 and the camera module 01 shown in FIG. 2a lies in that an opening of a V-shaped groove structure that is formed by a first reflective surface 1a and a first reflective surface 1b faces a second optical path folding element 12, an opening of a V-shaped groove structure that is formed by a fourth reflective surface 4a and a fourth reflective surface 4b faces the second optical path folding element 12, a second reflective surface 2a and a second reflective surface 2b that are on the second optical path folding element 12 are successively disposed opposite and parallel to the first reflective surface 1a and the first reflective surface 1b, and a third reflective surface 3a and a third reflective surface 3b are successively disposed opposite and parallel to the fourth reflective surface 4a and the fourth reflective surface 4b. "Parallel" herein refers to substantially parallel, that is, for a person skilled in the art, "parallel" may be absolutely parallel, or there may be an included angle (for example, an angle error within a range of ±3°). An included angle θ5 between the second reflective surface 2a and the third reflective surface 3a, and an included angle θ5 between the second reflective surface 2b and the third reflective surface 3b both meet: 0°<θ5<180°.

Figure 10A:
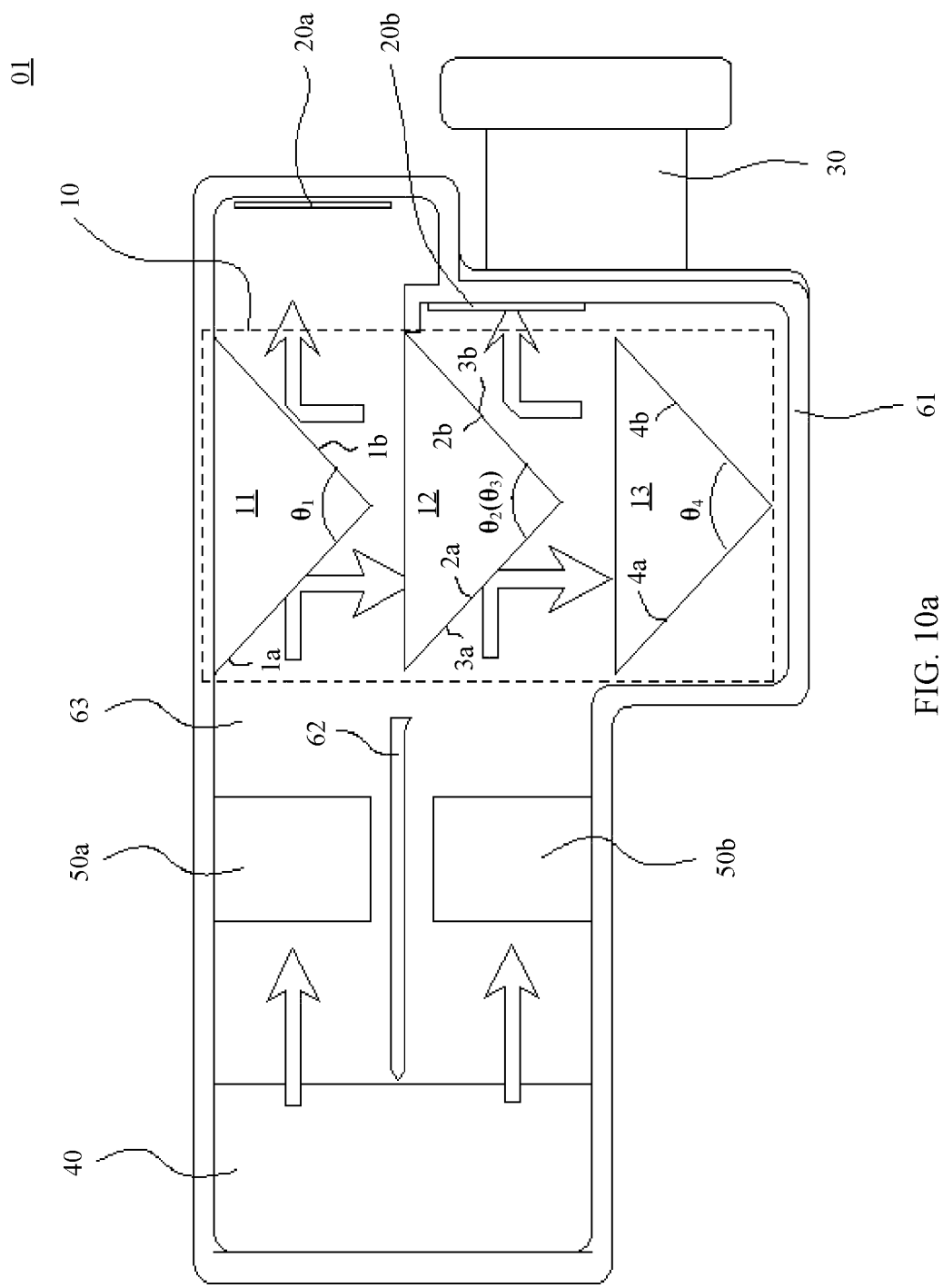
FIG. 10a is a top view of another camera module according to an embodiment of this application.
Figure 10B:
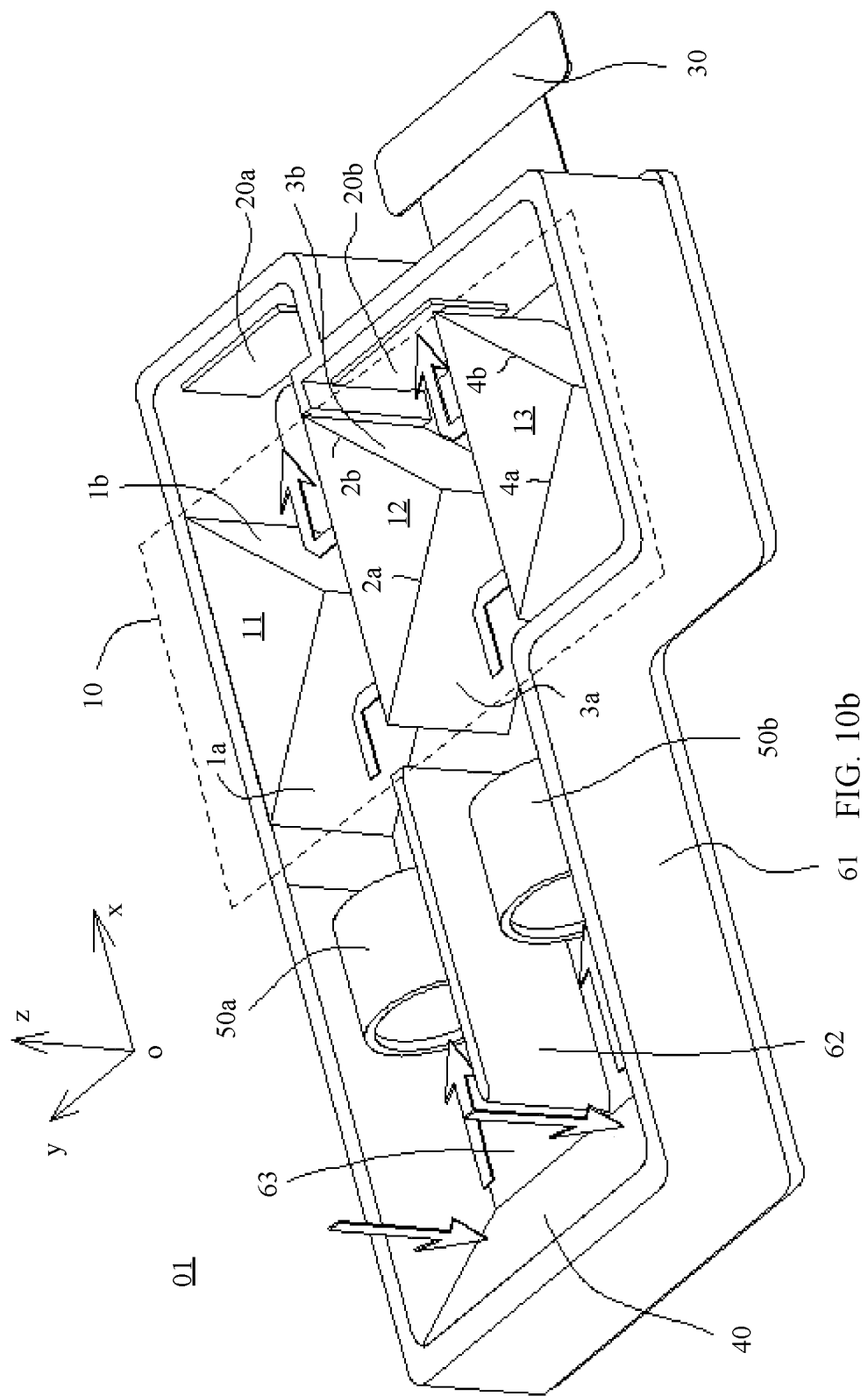
Figure 10C:
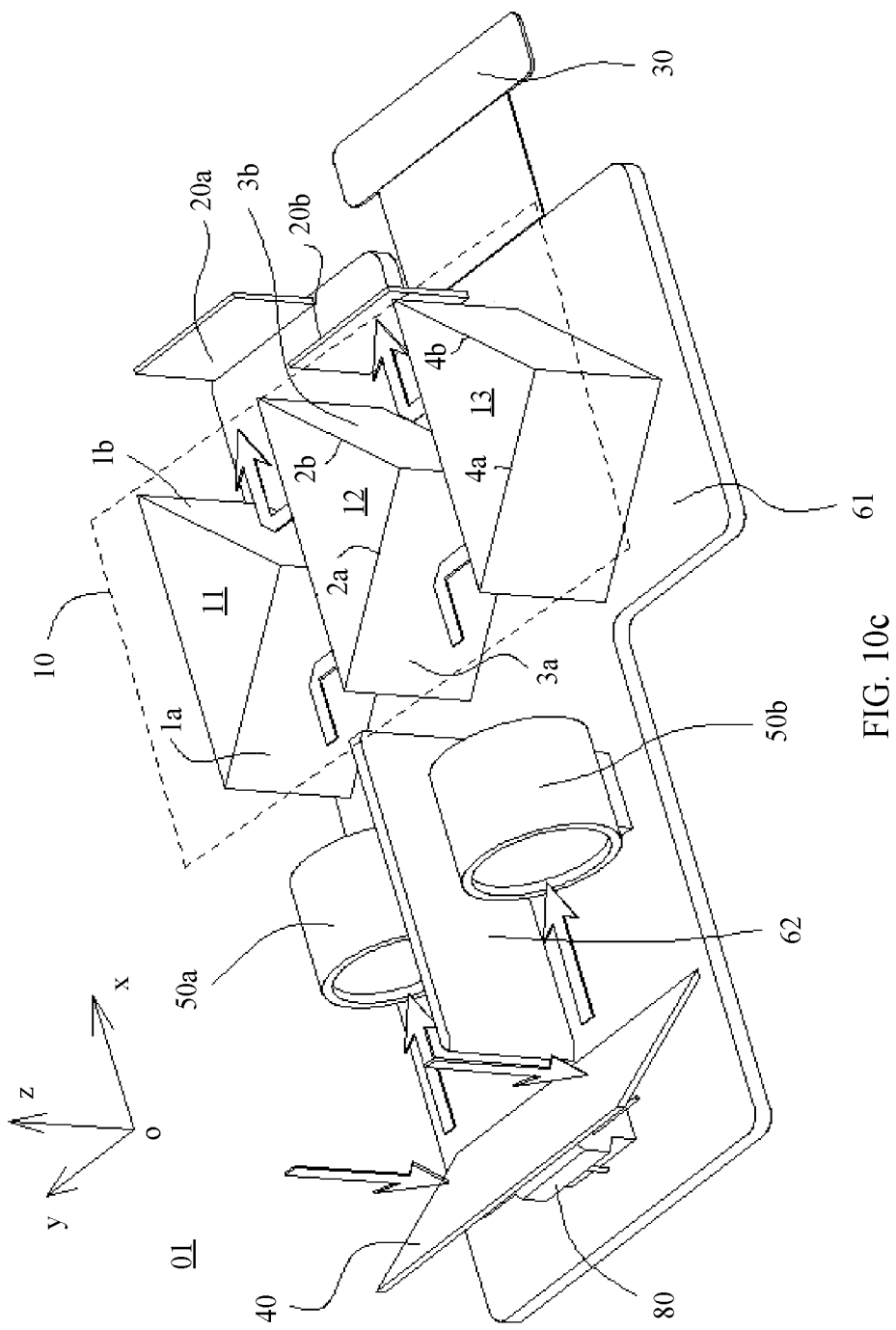
FIG. 10c is a schematic diagram of the camera module shown in FIG. 10b after a housing is removed.

FIG. 10a is a top view of another camera module according to an embodiment of this application. FIG. 10b is a stereoscopic diagram of the camera module shown in FIG. 10a. FIG. 10c is a schematic diagram of the camera module shown in FIG. 10b after a housing is removed. A difference between an embodiment shown in FIG. 10a to FIG. 10c and the embodiment shown in FIG. 2a to FIG. 2c lies in that the "V"-shaped structure in the first optical path folding element 11 that is formed by the plane mirror 11i and the plane mirror 11j is replaced with a right-angle triangular prism. An outer side of one right-angle surface of the right-angle triangular prism is used as a first reflective surface 1a, and an outer side of the other right-angle surface is used as a first reflective surface 1b. Correspondingly, the "V"-shaped structure in the second optical path folding element 12 that is formed by the plane mirror 12i and the plane mirror 12j is also replaced with a right-angle triangular prism. An inner side of one right-angle surface of the right-angle triangular prism is used as a second reflective surface 2a, and an outer side thereof is used as a third reflective surface 3a. An inner side of the other right-angle surface is used as a second reflective surface 2b, and an outer side thereof is used as a third reflective surface 3b. In addition, the "V"-shaped structure in the third optical path folding element 13 that is formed by the plane mirror 13i and the plane mirror 13j is replaced with a right-angle triangular prism. An inner side of one right-angle surface of the right-angle triangular prism is used as a fourth reflective surface 4a, and an inner side of the other right-angle surface is used as a fourth reflective surface 4b. A reflective surface with a same name in FIG. 10a to FIG. 10c plays a same role as that in FIG. 2a to FIG. 2c, where θ1=θ2=θ3=θ4=90°.

Similarly, any "V"-shaped structure including but not limited to those in FIG. 2a to FIG. 8 may be replaced with a right-angle triangular prism. For a manner of replacement, refer to forms in FIG. 10a to FIG. 10c. In addition, each reflective surface may be replaced with an inner side or an outer side of one right-angle surface of the right-angle triangular prism as a reflective surface.

In addition, each first reflective surface may be formed by using an inner side or an outer side of one right-angle surface of one right-angle triangular prism, or may be formed by using a reflective surface of one plane mirror. Therefore, when the first optical path folding element 11 has the M1 first reflective surfaces, at least a part of the first reflective surfaces is the reflective surface of the plane mirror, and/or at least a part of the first reflective surfaces is the inner side or the outer side of the right-angle surface of the right-angle triangular prism. This is the same for each second reflective surface, each third reflective surface, and each fourth reflective surface.

The second optical path folding element 12 may include at least one right-angle triangular prism, or may include at least one plane mirror, or may be formed by both a plane mirror and a right-angle triangular prism.

All the foregoing embodiments meet the following:

Condition 1: Along a direction away from the first optical lens assembly (for example, with reference to the x-axis positive direction in FIG. 5a, FIG. 6, and FIG. 8), the M1 first reflective surfaces are successively connected (that is, the M1 first reflective surfaces are continuously disposed), and the M2 second reflective surfaces are successively connected (that is, the M2 second reflective surfaces are continuously disposed). When M1≤M2 (as shown in FIG. 5a and FIG. 8), each of the M1 first reflective surfaces is parallel to one of the M2 second reflective surfaces; or when M1>M2 (as shown in FIG. 6), each of the M2 second reflective surfaces is parallel to one of the M1 first reflective surfaces. Alternatively, in other words, along the direction away from the first optical lens assembly (with reference to the x-axis positive direction in FIG. 5a, FIG. 6, and FIG. 8), an $i^{th}$ first reflective surface is disposed opposite and parallel to an $i^{th}$ second reflective surface, where i is a positive integer, i≤P, and P is a smaller value in M1 and M2. In the statement that "an $i^{th}$ first reflective surface is disposed opposite and parallel to an $i^{th}$ second reflective surface", the former i and the latter i are always the same value, for example, are equal to 1 or 2. In addition, the included angle θ1 of every two adjacent first reflective surfaces meets: 60°≤θ1≤120°, and the included angle θ2 of every two adjacent second reflective surfaces meets: 60°≤θ2≤120°. Therefore, the included angle θ1 between every two adjacent first reflective surfaces is equal to the included angle θ2 between every two adjacent second reflective surfaces. It should be understood that, "parallel" in this paragraph refers to substantially parallel, that is, for a person skilled in the art, "parallel" may be absolutely parallel, or there may be an included angle (for example, an angle error within a range of ±3°).

Condition 2: Along a direction away from the second optical lens assembly (for example, with reference to the x-axis positive direction in FIG. 5a, FIG. 6, FIG. 7, and FIG. 8), the M3 third reflective surfaces are successively connected (that is, the M3 third reflective surfaces are continuously disposed), and the M4 fourth reflective surfaces are successively connected (that is, the M4 fourth reflective surfaces are continuously disposed). When M3≤M4 (as shown in FIG. 8), each of the M3 third reflective surfaces is parallel to one of the M4 fourth reflective surfaces; or when M3>M4 (as shown in FIG. 7), each of the M4 fourth reflective surfaces is parallel to one of the M3 third reflective surfaces. In other words, along the direction away from the second optical lens assembly (for example, with reference to the x-axis positive direction in FIG. 5a, FIG. 6, FIG. 7, and FIG. 8), a $j^{th}$ third reflective surface is disposed opposite and parallel to a $j^{th}$ fourth reflective surface, where j is a positive integer, j≤Q, and Q is a smaller value in M3 and M4. In the statement that "a $j^{th}$ third reflective surface is disposed opposite and parallel to a $j^{th}$ fourth reflective surface", the former j and the latter j are always equal, for example, are always equal 1 or 2. In addition, the included angle θ3 of every two adjacent third reflective surfaces meets: 60°≤θ3≤120°, and the included angle θ4 of every two adjacent fourth reflective surfaces meets: 60°≤θ4≤120°. Therefore, the included angle θ3 between every two adjacent third reflective surfaces is equal to the included angle θ4 between every two adjacent fourth reflective surfaces. It should be understood that, "parallel" in this paragraph refers to substantially parallel, that is, for a person skilled in the art, "parallel" may be absolutely parallel, or there may be an included angle (for example, an angle error within a range of ±3°).

However, this is merely an example. The camera module provided in the embodiments of this application may meet only one of Condition 1 and Condition 2, or meet neither Condition 1 nor Condition 2. Specifically, an included angle between the first reflective surface and the corresponding second reflective surface is greater than 0, that is, θ1 is unequal to θ2, and an included angle between the third reflective surface and the corresponding fourth reflective surface is greater than 0, that is, θ3 is unequal to θ4. Alternatively, the first reflective surface is not in a one-to-one correspondence with the second reflective surface, and the third reflective surface is not in a one-to-one correspondence with the fourth reflective surface, only if the following conditions are met:

The first optical path folding element has the M1 first reflective surfaces, and the second optical path folding element has the M2 second reflective surfaces. The light from the first optical lens assembly is reflected between the M1 first reflective surfaces and the M2 second reflective surfaces, to perform optical path folding, and the folded light is reflected to the first image sensor. The second optical path folding element includes the M3 third reflective surfaces, and the third optical path folding element includes the M4 fourth reflective surfaces. The light from the second optical lens assembly is reflected between the M3 third reflective surfaces and the M4 fourth reflective surfaces, to perform optical path folding, and the folded light is reflected to the second image sensor, where M1, M2, M3, and M4 are all positive integers.

In addition to folding the optical path based on reflection, the optical path may be further folded based on a refraction principle. Therefore, to achieve an effect that the first optical path folding element and the third optical path folding element share the second optical path folding element to reduce a size of the camera module, it only needs to meet the following:

The light adjustment assembly includes the first optical path folding element, the second optical path folding element, and the third optical path folding element. The first optical path folding element and the third optical path folding element are respectively located on two sides of the second optical path folding element. The first optical path folding element cooperates with the second optical path folding element, to perform optical path folding on the light from the first optical lens assembly and focus the light on the first image sensor. The third optical path folding element cooperates with the second optical path folding element, to perform optical path folding on the light from the second optical lens assembly and focus the light on the second image sensor.

Embodiments of this application further provide some other specific forms of a camera module 01.

Figure 11:
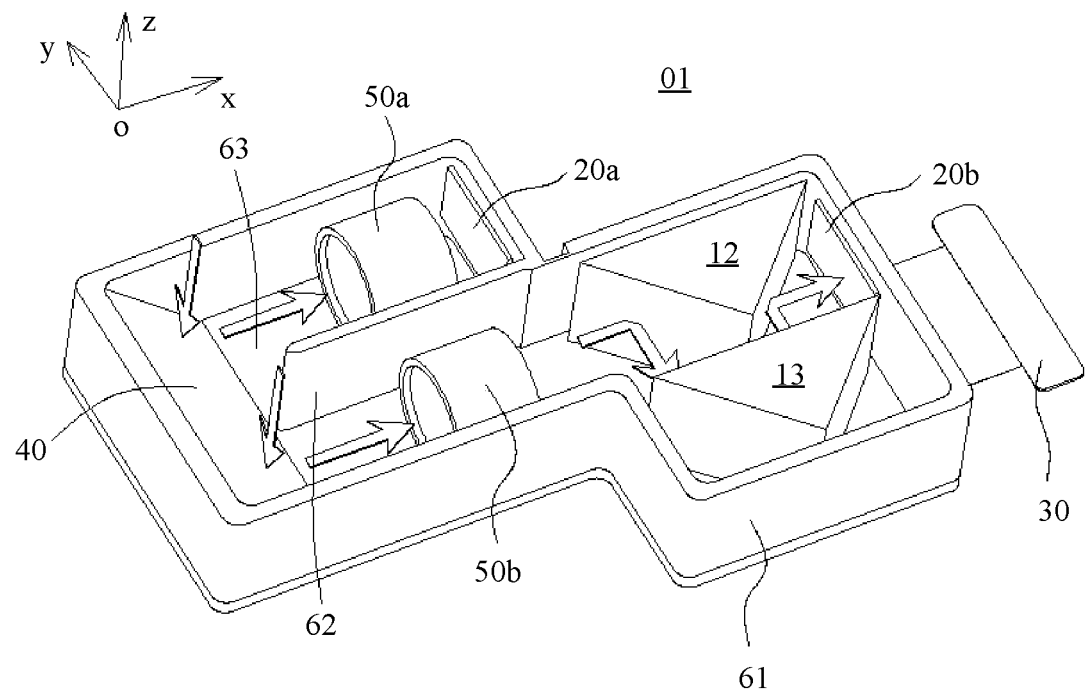
FIG. 11 is a stereoscopic diagram of another camera module according to an embodiment of this application.

FIG. 11 is a stereoscopic diagram of another camera module according to an embodiment of this application. A difference between that of FIG. 11 and the embodiments corresponding to FIG. 10a to FIG. 10c lies in that the first optical path folding element 11 is removed, and the first image sensor 20a may be properly close to the first optical lens assembly 50a, so that light passing through the first optical lens assembly 50a is directly emitted to the first image sensor 20a. Any right-angle triangular prism may be replaced with a "V"-shaped structure formed by two plane mirrors.

Figure 12:
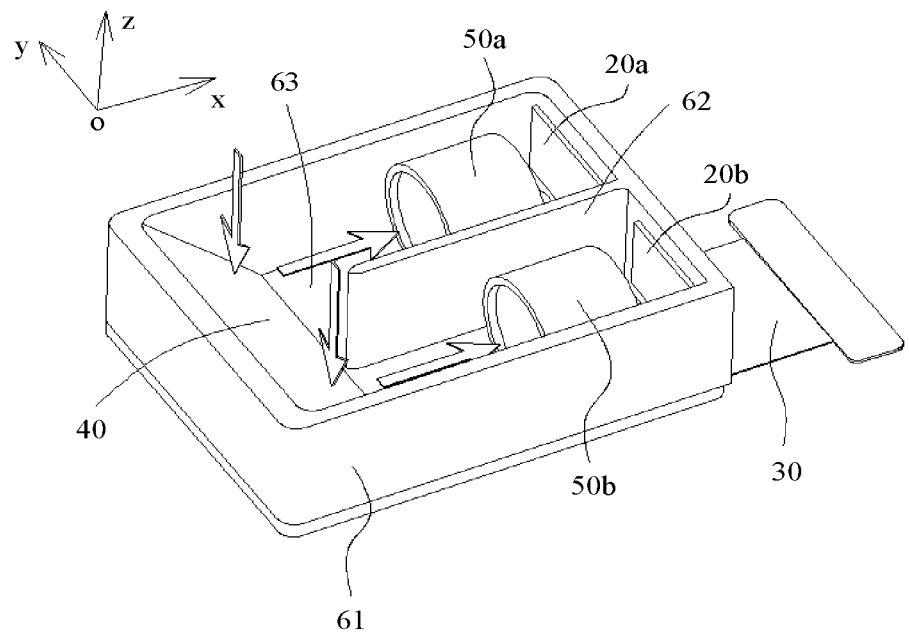
FIG. 12 is a stereoscopic diagram of another camera module according to an embodiment of this application.

FIG. 12 is a stereoscopic diagram of another camera module according to an embodiment of this application. A difference between FIG. 12 and FIG. 2b is that the light adjustment assembly 10 is completely removed.

Based on a same technical concept, an embodiment of this application further provides a terminal device. The terminal device may be a device that has a photographing, video recording, or another picture collection function, for example, a mobile phone, a tablet computer, and a PDA (personal digital assistant, personal digital assistant).

For the terminal device, refer to FIG. 1. For example, the terminal device is a mobile phone. The mobile phone may include a protective case 03, a middle frame 04, and a display screen 02. The display screen 02 may be on a front side of the middle frame 04, the protective case 03 is on a rear side of the middle frame 04, and a cooperation manner of the protective case 03, the middle frame 04, and the display screen 02 may be known in the conventional technology. This is not described herein. The terminal device further includes the camera module 01 provided in the embodiments of this application, and the camera module 01 is located between the protective case 03 and the middle frame 04. A light opening is provided on a rear side of the protective case 03, and light of an external environment enters the terminal device from the light opening, to enter the camera module 01 for imaging. The periscope reflector 40 is opposite to the light opening. The periscope reflector 40, the first optical lens assembly 50a (the second optical lens assembly 50b), and the light adjustment assembly 10 are arranged along a direction parallel to the display screen 02. It should be understood that, "parallel" in this paragraph refers to substantially parallel, that is, for a person skilled in the art, "parallel" may be absolutely parallel, or there may be an included angle (for example, an angle error within a range of ±3°).

It should be understood that, in FIG. 1, the camera module 01 is covered by the protective case 03. In this case, in other words, the camera module 01 is located inside the protective case 03.

It can be learned from corresponding analysis of the camera module 01 provided in the foregoing embodiments that the camera module 01 has a miniaturized structure. Therefore, after the terminal device uses the camera module 01, it is also beneficial to implementing miniaturization.

In addition, all parts in the accompanying drawings in the embodiments of this application are merely used to indicate a working principle of the camera module or the terminal device, and do not truly reflect an actual size relationship of the parts.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A camera module, comprising a first optical lens assembly, a second optical lens assembly, a light adjustment assembly, a first image sensor, and a second image sensor, wherein:
   both the first optical lens assembly and the second optical lens assembly are configured to receive light from a photographed object;
   the light adjustment assembly comprises a first optical path folding element, a second optical path folding element, and a third optical path folding element, wherein the first optical path folding element and the third optical path folding element are respectively located on two sides of the second optical path folding element;

the first optical path folding element cooperates with the second optical path folding element to:
  perform optical path folding on light from the first optical lens assembly; and
  focus the light from the first optical lens assembly on the first image sensor; and the third optical path folding element cooperates with the second optical path folding element to:
  perform optical path folding on light from the second optical lens assembly; and
  focus the light from the second optical lens assembly on the second image sensor.

2. The camera module according to claim 1, wherein:
the first optical path folding element has M1 first reflective surfaces, the MI first reflective surfaces face the second optical path folding element, the second optical path folding element has M2 second reflective surfaces, and the M2 second reflective surfaces face the first optical path folding element;
the light from the first optical lens assembly is reflected between the M1 first reflective surfaces and the M2 second reflective surfaces to perform optical path folding, and folded light generated by the optical path folding is reflected to the first image sensor;
the second optical path folding element comprises M3 third reflective surfaces, the M3 third reflective surfaces face the third optical path folding element, the third optical path folding element comprises M4 fourth reflective surfaces, and the M4 fourth reflective surfaces face the second optical path folding element; and
the light from the second optical lens assembly is reflected between the M3 third reflective surfaces and the M4 fourth reflective surfaces to perform optical path folding, and folded light generated by the optical path folding is reflected to the second image sensor, wherein M1, M2, M3, and M4 are all positive integers.

3. The camera module according to claim 2, wherein:
along a direction away from the first optical lens assembly, the M1 first reflective surfaces are successively connected, and the M2 second reflective surfaces are successively connected;
when M1≤M2, each of the M1 first reflective surfaces is parallel to one of the M2 second reflective surfaces; or
when M1>M2, each of the M2 second reflective surfaces is parallel to one of the MI first reflective surfaces; and
an included angle θ1 of every two adjacent first reflective surfaces satisfies: $60°≤θ1≤120°$, and an included angle θ2 of every two adjacent second reflective surfaces satisfies: $60°≤θ2≤120°$.

4. The camera module according to claim 3, wherein |M1−M2|=1, and wherein:
when M1>M2, a last first reflective surface is bent in a direction toward the second optical path folding element, and the last first reflective surface is configured to reflect light from a first reflective surface, previous to the last first reflective surface, to the first image sensor along a first direction, wherein the first direction is a direction in which the first optical path folding element points to the third optical path folding element, and the last first reflective surface is a first reflective surface farthest from the first optical lens assembly; or when M1<M2, a last second reflective surface is bent in a direction toward the first optical path folding element, and the last second reflective surface is configured to reflect light from a second reflective surface, previous to the last second reflective surface, to the first image sensor along a second direction, wherein the second direction is a direction in which the third optical path folding element points to the first optical path folding element, and the last second reflective surface is a second reflective surface farthest from the first optical lens assembly.

5. The camera module according to claim 3, wherein:
along a direction away from the second optical lens assembly, the M3 third reflective surfaces are successively connected, and the M4 fourth reflective surfaces are successively connected;
when M3≤M4, each of the M3 third reflective surfaces is parallel to one of the M4 fourth reflective surfaces; or
when M3>M4, each of the M4 fourth reflective surfaces is parallel to one of the M3 third reflective surfaces; and
an included angle θ3 of every two adjacent third reflective surfaces meets: $60°≤θ3≤120°$, and an included angle θ4 of every two adjacent fourth reflective surfaces meets: $60°≤θ4≤120°$.

6. The camera module according to claim 5, wherein |M3−M4|=1, and wherein:
when M3>M4, a last third reflective surface is bent in a direction toward the third optical path folding element, and the last third reflective surface is configured to reflect light from a third reflective surface, previous to the last third reflective surface, to the second image sensor along a first direction, wherein the first direction is a direction in which the first optical path folding element points to the third optical path folding element, and the last third reflective surface is a third reflective surface farthest from the second optical lens assembly; or when M3<M4, a last fourth reflective surface is bent in a direction toward the third optical path folding element, and the last fourth reflective surface is configured to reflect light from a fourth reflective surface, previous to the last fourth reflective surface, to the second image sensor along a second direction, wherein the second direction is a direction in which the third optical path folding element points to the first optical path folding element, and the last fourth reflective surface is a fourth reflective surface farthest from the second optical lens assembly.

7. The camera module according to claim 5, wherein M2=M3, the M2 second reflective surfaces are in a one-to-one correspondence with the M3 third reflective surfaces, a second reflective surface and a third reflective surface that correspond to each other in each group are disposed back-to-back, and an included angle θ5 between the second reflective surface and the third reflective surface that correspond to each other in each group satisfies: $0°<θ5<180°$.

8. The camera module according to claim 2, wherein M2=M3, the M2 second reflective surfaces are in a one-to-one correspondence with the M3 third reflective surfaces, and a second reflective surface and a third reflective surface that correspond to each other in each group are disposed back-to-back and are parallel to each other.

9. The camera module according to claim 2, wherein:
at least a subset of the M1 first reflective surfaces comprise a reflective surface of a plane mirror, and/or at least a subset of the MI first reflective surfaces comprise an inner side or an outer side of a right-angle surface of a right-angle triangular prism;

at least a subset of the M2 second reflective surfaces comprise a reflective surface of a plane mirror, and/or at least a subset of the M2 second reflective surfaces comprise an inner side or an outer side of a right-angle surface of a right-angle triangular prism;

at least a subset of the M3 third reflective surfaces comprise a reflective surface of a plane mirror, and/or at least a subset of the M3 third reflective surfaces comprise an inner side or an outer side of a right-angle surface of a right-angle triangular prism; and at least a subset of the M4 fourth reflective surfaces comprise a reflective surface of a plane mirror, and/or at least a subset of the M4 fourth reflective surfaces comprise an inner side or an outer side of a right-angle surface of a right-angle triangular prism.

10. The camera module according to claim 2, wherein: the second optical path folding element comprises at least one right-angle triangular prism;

inner sides of two right-angle surfaces of each right-angle triangular prism face the first optical path folding element and form two second reflective surfaces; and outer sides of the two right-angle surfaces of each right-angle triangular prism face the third optical path folding element and form two third reflective surfaces.

11. The camera module according to claim 2, wherein: the second optical path folding element comprises at least one plane mirror; and one side surface of each plane mirror faces the first optical path folding element and forms one second reflective surface, and the other side surface of each plane mirror faces the third optical path folding element and forms one third reflective surface.

12. The camera module according to claim 1, wherein the camera module further comprises a drive assembly, and wherein the drive assembly is configured to:

adjust a distance between the first optical path folding element and the second optical path folding element to focus the light from the first optical lens assembly on the first image sensor; and adjust a distance between the second optical path folding element and the third optical path folding element to focus the light from the second optical lens assembly on the second image sensor.

13. The camera module according to claim 12, wherein the drive assembly is configured to:

drive the second optical path folding element to move in a direction close to the first optical path folding element or in a direction close to the third optical path folding element.

14. The camera module according to claim 12, wherein the drive assembly is configured to:

drive the first optical path folding element to be close to or away from the second optical path folding element; and drive the third optical path folding element to be close to or away from the second optical path folding element.

15. A terminal device, comprising a protective case and a camera module, wherein:

the camera module is disposed inside the protective case;

the camera module comprises a first optical lens assembly, a second optical lens assembly, a light adjustment assembly, a first image sensor, and a second image sensor, wherein:

the first optical lens assembly and the second optical lens assembly are configured to receive light from a photographed object;

the light adjustment assembly comprises a first optical path folding element, a second optical path folding element, and a third optical path folding element, wherein the first optical path folding element and the third optical path folding element are respectively located on two sides of the second optical path folding element;

the first optical path folding element cooperates with the second optical path folding element to:

perform optical path folding on light from the first optical lens assembly; and focus the light from the first optical lens assembly on the first image sensor; and the third optical path folding element cooperates with the second optical path folding element to:

perform optical path folding on light from the second optical lens assembly; and focus the light from the second optical lens assembly on the second image sensor.

16. The terminal device according to claim 15, wherein: the first optical path folding element has MI first reflective surfaces, the MI first reflective surfaces face the second optical path folding element, the second optical path folding element has M2 second reflective surfaces, and the M2 second reflective surfaces face the first optical path folding element;

the light from the first optical lens assembly is reflected between the M1 first reflective surfaces and the M2 second reflective surfaces to perform optical path folding, and folded light generated by the optical path folding is reflected to the first image sensor;

the second optical path folding element comprises M3 third reflective surfaces, the M3 third reflective surfaces face the third optical path folding element, the third optical path folding element comprises M4 fourth reflective surfaces, and the M4 fourth reflective surfaces face the second optical path folding element; and the light from the second optical lens assembly is reflected between the M3 third reflective surfaces and the M4 fourth reflective surfaces to perform optical path folding, and folded light generated by the optical path folding is reflected to the second image sensor, wherein M1, M2, M3, and M4 are all positive integers.

17. The terminal device according to claim 16, wherein: along a direction away from the first optical lens assembly, the MI first reflective surfaces are successively connected, and the M2 second reflective surfaces are successively connected;

when M1≤M2, each of the M1 first reflective surfaces is parallel to one of the M2 second reflective surfaces; or when M1>M2, each of the M2 second reflective surfaces is parallel to one of the M1 first reflective surfaces; and an included angle θ1 of every two adjacent first reflective surfaces satisfies: 60°≤θ1≤120°, and an included angle θ2 of every two adjacent second reflective surfaces satisfies: 60°≤θ2≤120°.

18. The terminal device according to claim 17, wherein |M1-M2|=1, and wherein;

when M1>M2, a last first reflective surface is bent in a direction toward the second optical path folding element, and the last first reflective surface is configured to reflect light from a first reflective surface, previous to the last first reflective surface, to the first image sensor along a first direction, wherein the first direction is a direction in which the first optical path folding element points to the third optical path folding element, and the last first reflective surface is a first reflective surface farthest from the first optical lens assembly; or when M1<M2, a last second reflective surface is bent in a direction toward the first optical path folding element, and the last second reflective surface is configured to reflect light from a second reflective surface, previous to the last second reflective surface, to the first image sensor along a second direction, wherein the second direction is a direction in which the third optical path folding element points to the first optical path folding element, and the last second reflective surface is a second reflective surface farthest from the first optical lens assembly.

19. The terminal device according to claim 17, wherein:

along a direction away from the second optical lens assembly, the M3 third reflective surfaces are successively connected, and the M4 fourth reflective surfaces are successively connected;

when M3≤M4, each of the M3 third reflective surfaces is parallel to one of the M4 fourth reflective surfaces; or when M3>M4, each of the M4 fourth reflective surfaces is parallel to one of the M3 third reflective surfaces; and an included angle θ3 of every two adjacent third reflective surfaces meets: 60°≤θ3≤120°, and an included angle θ4 of every two adjacent fourth reflective surfaces meets: 60°≤θ4≤120°.

20. The terminal device according to claim 19, wherein |M3-M4|=1, and wherein:

when M3>M4, a last third reflective surface is bent in a direction toward the third optical path folding element, and the last third reflective surface is configured to reflect light from a third reflective surface, previous to the last third reflective surface, to the second image sensor along a first direction, wherein the first direction is a direction in which the first optical path folding element points to the third optical path folding element, and the last third reflective surface is a third reflective surface farthest from the second optical lens assembly; or when M3<M4, a last fourth reflective surface is bent in a direction toward the third optical path folding element, and the last fourth reflective surface is configured to reflect light from a fourth reflective surface, previous to the last fourth reflective surface, to the second image sensor along a second direction, wherein the second direction is a direction in which the third optical path folding element points to the first optical path folding element, and the last fourth reflective surface is a fourth reflective surface farthest from the second optical lens assembly.

* * * * *